(12) United States Patent
Fang

(10) Patent No.: US 12,539,106 B2
(45) Date of Patent: Feb. 3, 2026

(54) DEVICE FOR COLLECTING TEST SPECIMEN

(71) Applicant: Zhejiang Orient Gene Biotech Co., Ltd, Zhejiang (CN)

(72) Inventor: Jianqiu Fang, Zhejiang (CN)

(73) Assignee: ZHEJIANG ORIENT GENE BIOTECH CO., LTD, Anji Huzhou (CN)

( * ) Notice: Subject to any disclaimer, the term of this patent is extended or adjusted under 35 U.S.C. 154(b) by 854 days.

(21) Appl. No.: 17/748,769

(22) Filed: May 19, 2022

(65) Prior Publication Data

US 2023/0218277 A1 Jul. 13, 2023

Related U.S. Application Data

(60) Provisional application No. 63/300,811, filed on Jan. 19, 2022.

(30) Foreign Application Priority Data

Jan. 10, 2022 (CN) .......................... 202210024877.9

(51) Int. Cl.
*A61B 5/00* (2006.01)
*A61B 10/00* (2006.01)

(52) U.S. Cl.
CPC ................................ *A61B 10/0045* (2013.01)

(58) Field of Classification Search
CPC .......... A61B 10/0045; A61B 5/150022; A61B 5/150343; A61B 2010/0006; A61B 2010/0074; A61B 10/0038; A61B 10/0051; A61B 10/0058; A61B 10/007; A61B 2010/0216; A61B 10/02; A61B 10/0064; A61B 10/0096; A61B 2010/0077; A61F 13/38; A61F 13/385; G01N 1/14; B29C 69/001; B29C 66/433; B29C 65/741; B29C 65/745; B29C 65/7844

See application file for complete search history.

(56) References Cited

U.S. PATENT DOCUMENTS

| | | | | |
|---|---|---|---|---|
| 4,136,680 A | * | 1/1979 | Southworth | C12M 33/02 600/572 |
| 4,175,008 A | * | 11/1979 | White | C12M 33/02 206/209 |
| 4,175,560 A | * | 11/1979 | Knoll | A61F 13/36 604/1 |
| 4,196,167 A | * | 4/1980 | Olsen | B01L 3/505 600/572 |
| 4,718,889 A | * | 1/1988 | Blasius, Jr. | A61F 13/38 604/1 |

(Continued)

FOREIGN PATENT DOCUMENTS

| | | |
|---|---|---|
| AU | 2004226798 A1 | 10/2004 |
| IN | 101103931 A | 1/2008 |
| JP | 4579902 B2 | 11/2010 |

*Primary Examiner* — May A Abouelela
(74) *Attorney, Agent, or Firm* — MUNCY, GEISSLER, OLDS & LOWE, P.C.

(57) ABSTRACT

The present invention provides a device for collecting a fluid specimen. The device comprises a water-absorbing end part formed by bonding a first porous water-absorbing film and a second porous water-absorbing film. Preferably, the second porous water-absorbing film and the first porous water-absorbing film are sponge films.

18 Claims, 16 Drawing Sheets

(56) References Cited

U.S. PATENT DOCUMENTS

| | | | | |
|---|---|---|---|---|
| 4,749,655 | A * | 6/1988 | Monthony | C12M 45/22 600/572 |
| 4,767,398 | A * | 8/1988 | Blasius, Jr. | A45D 40/28 604/1 |
| 4,857,453 | A | 8/1989 | Ullman et al. | |
| 4,877,036 | A * | 10/1989 | Saint-Amand | A61F 15/001 600/572 |
| 5,073,484 | A | 12/1991 | Swanson et al. | |
| 5,119,831 | A | 6/1992 | Robin et al. | |
| 5,185,127 | A | 2/1993 | Vonk | |
| 5,214,821 | A * | 6/1993 | Burrow | A47L 13/46 15/210.1 |
| 5,275,785 | A | 1/1994 | May et al. | |
| 5,295,952 | A * | 3/1994 | Pietrafitta | A61M 31/00 604/15 |
| 5,416,000 | A | 5/1995 | Allen et al. | |
| 5,504,013 | A | 4/1996 | Senior | |
| 5,602,040 | A | 2/1997 | May et al. | |
| 5,622,871 | A | 4/1997 | May et al. | |
| 5,627,071 | A * | 5/1997 | Triva | B01L 3/5082 422/550 |
| 5,654,162 | A | 8/1997 | Guire et al. | |
| 5,656,503 | A | 8/1997 | May et al. | |
| 5,686,315 | A | 11/1997 | Pronovost et al. | |
| 5,735,808 | A * | 4/1998 | Delgado | A61F 13/38 15/210.1 |
| 5,762,494 | A * | 6/1998 | Archambault | A61C 19/063 433/80 |
| 5,766,961 | A | 6/1998 | Pawlak et al. | |
| 5,770,460 | A | 6/1998 | Pawlak et al. | |
| 5,916,815 | A | 6/1999 | Lappe | |
| 5,928,165 | A * | 7/1999 | Caillouette | A61B 5/4337 600/572 |
| 5,928,176 | A * | 7/1999 | Nakatani | A61F 13/38 15/208 |
| 5,944,519 | A * | 8/1999 | Griffiths | A46B 7/04 15/210.1 |
| 5,976,895 | A | 11/1999 | Cipkowski | |
| 6,080,126 | A * | 6/2000 | Zygmont | A61F 13/385 600/572 |
| 6,140,136 | A | 10/2000 | Lee | |
| 6,187,269 | B1 | 2/2001 | Lancesseur et al. | |
| 6,187,598 | B1 | 2/2001 | May et al. | |
| 6,228,660 | B1 | 5/2001 | May et al. | |
| 6,235,241 | B1 | 5/2001 | Catt et al. | |
| 6,248,598 | B1 | 6/2001 | Bogema | |
| 6,306,642 | B1 | 10/2001 | Nelson et al. | |
| 6,352,862 | B1 | 3/2002 | Davis et al. | |
| 6,372,515 | B1 | 4/2002 | Casterlin et al. | |
| 6,379,620 | B1 | 4/2002 | Tydings et al. | |
| 6,403,383 | B1 | 6/2002 | Casterlin et al. | |
| 6,467,982 | B1 * | 10/2002 | Tsao | A61J 1/00 401/263 |
| 6,494,856 | B1 * | 12/2002 | Zygmont | A61F 13/38 604/1 |
| 6,503,013 | B2 * | 1/2003 | Strauss | A61M 35/006 401/133 |
| 6,524,530 | B1 * | 2/2003 | Igarashi | G01N 1/02 435/304.2 |
| 8,114,027 | B2 * | 2/2012 | Triva | C12M 33/02 600/573 |
| 8,317,728 | B2 | 11/2012 | Triva | |
| 8,631,715 | B2 * | 1/2014 | Triva | B01L 3/5029 73/864 |
| 8,979,784 | B2 | 3/2015 | Triva | |
| 9,011,358 | B2 | 4/2015 | Triva | |
| 9,170,177 | B2 * | 10/2015 | Triva | G01N 1/02 |
| 9,173,779 | B2 | 11/2015 | Triva | |
| 9,448,145 | B2 * | 9/2016 | Loktionov | G01N 1/30 |
| 9,504,452 | B2 * | 11/2016 | Triva | A61B 10/0096 |
| 10,240,181 | B2 * | 3/2019 | Driscoll | C12Q 1/008 |
| 10,327,741 | B2 | 6/2019 | Triva | |
| 10,935,555 | B2 * | 3/2021 | Salinas | G01N 33/577 |
| 11,147,657 | B2 * | 10/2021 | Pötsch | A46B 9/06 |
| 11,291,986 | B2 * | 4/2022 | Mantlo | G01N 35/00584 |
| 11,667,908 | B2 * | 6/2023 | Oommen | B01L 3/5029 435/6.12 |
| 12,232,937 | B2 * | 2/2025 | Chaffringeon | A61F 13/38 |
| 2002/0197738 | A1 * | 12/2002 | Matsumoto | B01L 3/5029 604/1 |
| 2003/0028123 | A1 * | 2/2003 | Pevoto | A61B 10/0045 600/572 |
| 2003/0108846 | A1 * | 6/2003 | Hoertsch | B08B 1/145 15/210.1 |
| 2003/0181840 | A1 * | 9/2003 | Tsaur | A61M 35/006 604/1 |
| 2004/0030263 | A1 * | 2/2004 | Dubrul | G01N 1/06 600/565 |
| 2004/0152206 | A1 * | 8/2004 | Davis | B01L 3/5023 436/514 |
| 2004/0158188 | A1 * | 8/2004 | Kauffmann | A61B 10/0096 604/1 |
| 2004/0197730 | A1 * | 10/2004 | Rowe | A61C 5/62 433/80 |
| 2004/0245125 | A1 * | 12/2004 | Trkulja | A61B 10/0045 206/223 |
| 2005/0010132 | A1 * | 1/2005 | Pestes | A61B 10/0051 600/572 |
| 2005/0106753 | A1 * | 5/2005 | Wu | B01L 3/0272 436/180 |
| 2005/0119589 | A1 * | 6/2005 | Tung | B01L 3/5023 600/584 |
| 2006/0211978 | A1 * | 9/2006 | Do | A61M 35/006 604/2 |
| 2007/0208274 | A1 * | 9/2007 | Ostrowski | A61B 10/0045 600/572 |
| 2007/0255175 | A1 * | 11/2007 | Sangha | A61B 90/94 600/572 |
| 2007/0299364 | A1 * | 12/2007 | Sangha | A61F 13/38 600/572 |
| 2009/0030341 | A1 * | 1/2009 | Kshirsagar | C12M 33/02 600/572 |
| 2010/0249649 | A1 * | 9/2010 | Larkin | A61B 10/02 600/569 |
| 2011/0004122 | A1 * | 1/2011 | Sangha | A61B 10/0045 600/572 |
| 2012/0283616 | A1 * | 11/2012 | Edme | A61F 13/38 604/1 |
| 2013/0184684 | A1 * | 7/2013 | Yardley | A61F 13/126 606/162 |
| 2013/0245495 | A1 * | 9/2013 | Li | C12M 33/02 600/572 |
| 2014/0154690 | A1 * | 6/2014 | Loktionov | A61B 10/0038 435/7.1 |
| 2015/0216471 | A1 * | 8/2015 | Goldstein | A61B 5/682 600/573 |
| 2016/0310328 | A1 * | 10/2016 | Pourbaba | A61F 13/38 |
| 2018/0161019 | A1 * | 6/2018 | Donovan | A61J 1/10 |
| 2018/0353737 | A1 * | 12/2018 | Chaffringeon | A61D 7/00 |
| 2019/0374394 | A1 * | 12/2019 | Diom | A61B 17/24 |
| 2019/0380884 | A1 * | 12/2019 | Matsushita | A45D 34/04 |
| 2020/0155125 | A1 * | 5/2020 | Ouyang | C12M 1/30 |
| 2020/0368069 | A1 * | 11/2020 | Horowitz | A61F 13/38 |
| 2020/0390425 | A1 * | 12/2020 | Chaffringeon | A61B 50/30 |

* cited by examiner

DEVICE FOR COLLECTING TEST SPECIMEN

CROSS REFERENCE OF THE RELATED APPLICATION

The present invention claims the priority of a Chinese patent application with application number of 202210024877.9 and filed on Jan. 10, 2022, and an American application with application No. 63/300,811 and filed on Jan. 19, 2022, the entirety of which, including the Specification, the Drawings and the Claims, is incorporated as a part of this specification.

TECHNICAL FIELD

The present invention relates to a device for collecting a liquid specimen, and particularly relates to a device for collecting a liquid specimen, such as collecting urine and saliva, belonging to the field of rapid diagnosis.

BACKGROUND

The following background introduction is just an introduction to some general background knowledge, and will not have any restrictions to the scope of the present invention.

It is well known that in the field of clinical diagnosis analysis an absorbing material for collecting biological specimens of human tissue is usually applied to a tail (also called as an end part) of a rod, and a wound fiber material such as artificial fibers or cotton and other natural fibers has necessary hydrophilic characteristics and can quickly absorb a sufficient number of samples for collection and testing. The fibers are usually firmly bonded along the end part of the rod by glue.

In general, especially in case of detecting the specimen by culturing microorganisms with the collected sample, the absorbing material is immediately immersed in a test tube containing a culture medium after the specimen is collected, and the sample is properly preserved during storage and/or transporting of the specimen to a laboratory.

Generally, the end part of the rod is made of a material with a certain hardness, such as plastic, by means of compression molding. For example, and there is generally a cut-off end, which makes it difficult for the rod wound with the absorbing material to be inserted into cavities (oral cavity, nasal cavity, eyes, rectum, urethra, and vagina) of patients needing specimen extracting if the end part is not well protected.

Therefore, the hydrophilic fiber material, being wound on the flattened end part of the rod, must be enough in amount to absorb a desired number of specimens (the required number is generally 100 microliters), and also must have enough thickness and be circular so that the periphery of an end face of a cut-off part can be protected, and the patients will not be injured or feel uncomfortable in the specimen collecting process. Moreover, the manufacturing cost is high, and thus it is difficult to achieve high-throughput manufacturing.

For the above reasons, the fiber material (like long line of fiber) is wound around the end part of the rod in a circular shape, its typical shape is that the end part is in a dome-like shape or a similar shape so that the fiber material can gradually become thicker in direction of winding around the cylindrical end part, and therefore the maximum thickness can be just achieved on the circumference of the end part at the cut-off part, and the best protection effect is achieved. The fiber material in such a shape will cause many defects while protecting the patient against the danger caused by the cut-off cylindrical end face. One of the main defects is the thickness of the fiber material, the collected specimen permeates into the fiber material due to the hydrophilic characteristic of fibers.

In light of practical use, when the specimen needs to be analyzed, the rod end wound with the absorbent material is simply clamped and slightly slides along a petri dish with the culture medium, and the fiber material is fully soaked with liquid. In the actual operation, the specimen is usually dispersed in the dish (by wiping), and even if the operation is carefully repeated, the same number of specimens (such as 100 ml) cannot be released because a part of the specimens permeates into the fiber material at the end part, these specimens permeating into the fiber material cannot be extruded to the surface of the fiber material and also cannot be released in the sliding extrusion process. There is another problem coming from bulky fibrous materials of the known absorbing materials, especially when they are used in the urethra or eyes.

It can be seen from flocked swabs described in the following patents: U.S. Pat. Nos. 8,114,027, 8,317,728, 8,979,784, 9,011,358, 9,173,779, 10,327,741, AU2004226798, JP4579902 and ZL200610099310.9. Although a conventional flocked swab can avoid the problem of conventional winding type sampling, its manufacturing cost is high, professional electrostatic equipment is needed for manufacturing, and meanwhile, the production efficiency is not high. In addition, in the using process, there are also some defects, for example, it is not friendly in sampling some special parts and will make people feel particularly uncomfortable. Moreover, in the manufacturing process, a surface of a rod-shaped element needs to be coated with glue, and the fibers are bonded on the surface in an electrostatic way, the process is complex. In actual use, due to bonding of short fibers, there might be a phenomenon of falling, so for the collection of some specimens, especially when multiple treatments are required, the fibers may fall off, these fallen fibers may affect the subsequent processing of the specimen, and even may affect the detection result.

Therefore, there is a need to provide additional collectors to overcome some of the defects and shortages of existing conventional products.

SUMMARY

The present invention aims to solve the above traditional problems. The present invention provides a sampling device, namely a device for collecting a specimen for clinical diagnosis analysis. The device comprises an end part that that is wrapped or covered with one or more layers of water-absorbing films.

In some embodiments, the sampling device comprises a rod-shaped element, wherein the end part wrapped with the one or more layers of water-absorbing films covers the rod-shaped element, thus the end part has water absorption. The end part of the rod-shaped element is made of plastics like PVC and PPP, alloy and other non-water-absorbing materials and cannot absorb water.

The word "wrapping" means that a porous water-absorbing film covers or two porous films are encircled to cover the end part of the rod-shaped element. The surface of the rod-shaped element cannot be seen from the outside, it indicates that the film directly or indirectly covers the surface of the end part of the rod-shaped element (FIG. 2A) (with glue or without glue), and there might be a certain distance between the films and the rod-shaped element (FIG. 2C).

In some embodiments, the one or more layers of porous films comprise a first porous water-absorbing film and a second porous water-absorbing film, and the first water-absorbing film and the second water-absorbing film are bonded to a surface of the end part of the rod-shaped element to form a wrapped end part, and thus a water-absorbing end part is formed. In some embodiments, the surface of the rod-shaped element is provided with a combination line or a bonded line.

In some embodiments, the first film material and the second film material are bonded together in a hot pressing method. In some embodiments, the first water-absorbing film and the second water-absorbing film are made of same materials. In some embodiments, the first film and the second film can be made of different materials. In some embodiments, one or both of the first porous water-absorbing film and the second water-absorbing film have the property of melting by heating, or have the property of bonding together after being melted by heating. In some embodiments, one or both of the first porous water-absorbing film and the second water-absorbing film have the property of melting at a high temperature, the high temperature can be 100-250° C., or 120-200° C. or 160-180° C. In some embodiments, the materials for forming the porous films have the property of bonding after being melted at the high temperature.

In some embodiments, the materials of the first film and the second film are selected from artificial fibers, and natural materials selected from cotton and silk, or a cotton and silk mixed material, or a sponge material, or a sponge and cotton mixed material, or a sponge and cotton thread mixed material. In some embodiments, the sponge is water-absorbing sponge. In some embodiments, the melting temperature of the sponge is below 500° C., and in some embodiments, the melting temperature is between 180° C. and 250° C. In some embodiments, the water-absorbing end part comprises a bonding line that is formed by bonding the porous films together through heating and/or melting. The bonding line is located at the water-absorbing end part, and in some embodiments, the bonding line is located on two sides and/or a top of the water-absorbing end part.

In some embodiments, the rod-shaped element is a rod without a hydrophilic fiber material, the film material covers the end part of the rod, and the film material is a porous water-absorbing material.

In some embodiments, the film material comprises a capillary water-absorbing material.

In some embodiments, the thickness of the porous water-absorbing film material is more than 0.1 mm, and in some embodiments, the water-absorbing material is a sponge material. The sponge material is a sponge film subjected to foaming treatment. The thickness of the sponge film made of the porous water-absorbing material is more than 0.05 mm, or more than 0.1 mm, or more than 0.2 mm, or ranges from 0.1 to 5 mm.

In some embodiments, it can be set for measuring the volume of liquid that can be absorbed. In some embodiments, the water-absorbing end part is capable of absorbing 0.1-1 milliliters of liquid, or 0.1-800 micro-liters of liquid, or 1-200 micro-liters of liquid, or 20-200 micro-liters of liquid. The water volume is on the basis of the area of the end part, the thickness of the water-absorbing film, the porous performance of the water-absorbing film and the capillary action of the water absorbing material, which can be freely adjusted.

In some embodiments, a concave area is an area for bonding the porous water-absorbing material to the surface of the rod-shaped element, and the bonding can be performed through the glue, or the porous films in this area are heated and melted to be bonded to the surface of the rod-shaped element. In some embodiments, the water-absorbing end part is provided with a top area and an area far away from the top area or an area opposite to the top area, wherein the area away from the top area comprises the concave area, and the concave area is an area which melted and bonded to the rod-shaped element. In some embodiments, the concave area is distributed on two sides of the water-absorbing end part or two sides or one side of a tail end of the water-absorbing end part. In some embodiments, the concave bonding area and the bonding line are positioned on a same side of the end part. In some embodiments, the area away from the water-absorbing end part is a contraction area, and the diameter of the contraction area is smaller than that of the top area. In some embodiments, a distant end is contracted relative to the top area, so that the whole size is reduced.

In some embodiments, the end part of the rod-shaped element is provided with a top end, the top end is provided with a porous film sleeve which extends outwards, the porous film sleeve extends out, rather than directly covering the top end, but extends out, as shown in a structure in FIG. 2. It can be understood that a longitudinal length of the whole porous film that cover the end part is greater than that of the end part of the rod-shaped element inside after bonding, and/or a transverse width of the sleeve formed by bonding the porous film is greater than that of the end part of the rod-shaped element, thus a softer porous film is formed, and the safety is improved in use. In some embodiments, a longitudinal tail end of the porous film is provided with a bonding point or a fixing structure so that the porous film is fixed to the longitudinal tail end of the rod-shaped element.

A toolbox for collecting and transporting a biological sample is characterized by comprising a test tube with treatment liquid and the device for collecting the liquid specimen.

In a second aspect, the present invention further provides a method for preparing a device for collecting a liquid specimen. The method comprises the following steps:

providing a rod without a hydrophilic fiber material, a first porous water-absorbing film and a second porous water-absorbing film, and enabling an end part of the rod to be positioned between the first porous water-absorbing film and the second porous water-absorbing film; and enabling the first film and the second film to wrap the end part of the rod so as to form a water-absorbing end part.

In some embodiments, the glue is applied to the end part of the rod, the end part is wrapped by the first porous water-absorbing film and the second porous water-absorbing film to form the water-absorbing end part, and the porous films are bonded to the outer surface of the end part through the glue.

In some embodiments, the length of the first porous water-absorbing film is greater than the perimeter or half of the perimeter of the end part, and the length of the second porous water-absorbing film is greater than the perimeter or half of the perimeter of the end part. When the end part is wrapped by the first porous film and the second porous film, a redundant porous film at a joint of the first porous film and the second porous film are cut off. In some embodiments, peripheries of the first film and the second film are bonded together in a hot pressing mode, and meanwhile, the redundant porous film is cut off in a hot pressing mode. The hot pressing can achieve the dual effects of bonding and cutting.

In some embodiments, the first film and the second film are porous water-absorbing films made of the sponge materials.

In some embodiments, the bonding is that the peripheries of the first film and the second film are bonded together in the hot pressing mode. In some embodiments, the bonding is that the edges of the first film and the second film are bonded together through the glue. In some embodiments, the first film and the second film are made of the porous water-absorbing sponges. In some embodiments, the porous water-absorbing sponges are foaming sponges. In some embodiments, the thickness of the first film and the thickness of the second film range from 0.1 to 0.5 mm.

In a third aspect, the present invention provides a device for producing and manufacturing the device for absorbing water and collecting the specimen of the present invention. The device comprises a mold, wherein the mold comprises a mold cavity, and the mold cavity is used for receiving a porous water-absorbing film and an end part of a rod-shaped element.

In some embodiments, the mold cavity comprises a cavity body for receiving the rod-shaped element and a wall for surrounding the mold cavity, and further comprises an edge positioned on the wall. In some embodiments, the mold cavity is provided with a longitudinal opening and a side opening, and the longitudinal opening is surrounded by the edge on the wall. The longitudinal opening is used for receiving the end part of the rod-shaped element and the porous water-absorbing film.

In some embodiments, the mold cavity comprises a bulge, and the bulge is used for extruding the porous film on the end part so that the porous film can be fixed on the surface of the end part of the rod-shaped element.

In some embodiments, the mold comprises an upper mold and a lower mold or a first mold and a second mold, wherein the first mold comprises a first mold cavity, and the second mold comprises a second mold cavity. By designing the mold cavities in such way, when the first mold cavity and the second mold cavity are closed or combined, the mold cavities substantially wrap the end part of the rod-shaped element. In some embodiments, the first mold cavity can accommodate a part of the end part of the rod-shaped element, and the second mold cavity can accommodate the rest part of the end part of the rod-shaped element. The end part of the rod-shaped element comprises a first end part and a second end part, and the first end part and the second end part form the whole end part. In some embodiments, the first mold cavity can accommodate the first porous film, and the first porous film covers the external surface of the first end part of the rod-shaped element when the first end part of the rod-shaped element is accommodated in the mold cavity. In some embodiments, the second mold cavity can accommodate the second porous film, and the second porous film covers the external surface of the second end part of the rod-shaped element when the second end part of the rod-shaped element is accommodated in the mold cavity.

In some embodiments, the first mold cavity and the second mold cavity are respectively provided with a bulge extrusion element, and when the first mold cavity and the second mold cavity are closed or combined, the bulge extrusion elements can oppositely extrude the porous water-absorbing film covering the outer surface of the end part of the rod-shaped element. In some embodiments, the concave-convex extrusion can generate heat, and the heat can enable the porous water-absorbing film to be melted.

In some embodiments, the bulge is arranged near the side opening of the mold cavity. In some embodiments, the diameter of the side opening is smaller than that of the top area of the end part of the rod-shaped element.

In some embodiments, a plurality of mold cavities are distributed on the mold at intervals, and the edges of the mold cavities are higher than the interval areas between the mold cavities. In some embodiments, the edges have the function of cutting off the porous film. In some embodiments, the edge of the mold cavity of the first mold and the edge of the mold cavity of the second mold can cut the joint of the first porous film and the second porous film when two films are extruded. In some embodiments, the edges have a certain temperature by which the first porous film or the second porous film can be melted at areas making contact with the edges, therefore, the first film and the second film are bonded. In some embodiments, the width of the areas making contact with the edges of the walls is 0.1-2 mm.

In a fourth aspect, the present invention provides a method for producing a water-absorbing collector. The method is completed by a device. The method comprises the following steps: providing a first mold and a second mold, wherein the first mold comprises a first mold cavity, and the second mold comprises a second mold cavity; covering the second mold cavity with a first porous film, enabling an end part of a rod-shaped element to be positioned above the first porous film, and enabling a second porous film to be positioned between the first mold cavity and the end part of the rod-shaped element; and closing or combining the first mold cavity and the second mold cavity, enabling the rod-shaped element to be positioned in a space defined by the first mold cavity and the second mold cavity, and enabling the first porous film and the second porous film to cover an outer surface of the rod-shaped element.

In some embodiments, the mold cavity comprises a wall that defines the mold cavity and an edge on the wall, and the edge forms an opening of the mold cavity. The first porous film and the second porous film are positioned between the first mold cavity and the second mold cavity, and the first porous film is positioned above the second porous film. The end part of the rod-shaped element is positioned between the first porous film and the second porous film. The first mold cavity and the second mold cavity are combined or closed so that the first porous film and the second porous film cover the outer surface of the rod-shaped element and wrap the whole end part.

In some embodiments, the edge of the first mold cavity and the edge of the second mold cavity are aligned and pressed against a boundary of the first porous film and the second porous film so that redundant porous films can be cut off by the edges. In some embodiments, the first film and the second film are bonded together by melting the areas making contact with the edges.

In some embodiments, the division is carried out according to the end part of the rod-shaped element, each edge comprises a left edge, a right edge and a top edge, the left and right edges can be used for cutting off or melting and bonding redundant films distributed on the left and right of the top part of the rod-shaped element, and the top edge is used for cutting or melting and bonding the redundant porous films wrapping the top.

In some embodiments, redundant waste materials (redundant films falling after being cut off or melted and bonded) are distributed in an interval area between the mold cavities.

Benefits

By adopting the above structure, another device for collecting the specimen is provided. The device is low in production and manufacturing cost and simple in process, but can still maintain the performance of collecting liquid, and can avoid some defects of a conventional flocking collection device.

DETAILED DESCRIPTION OF EMBODIMENTS

Figure 1B:
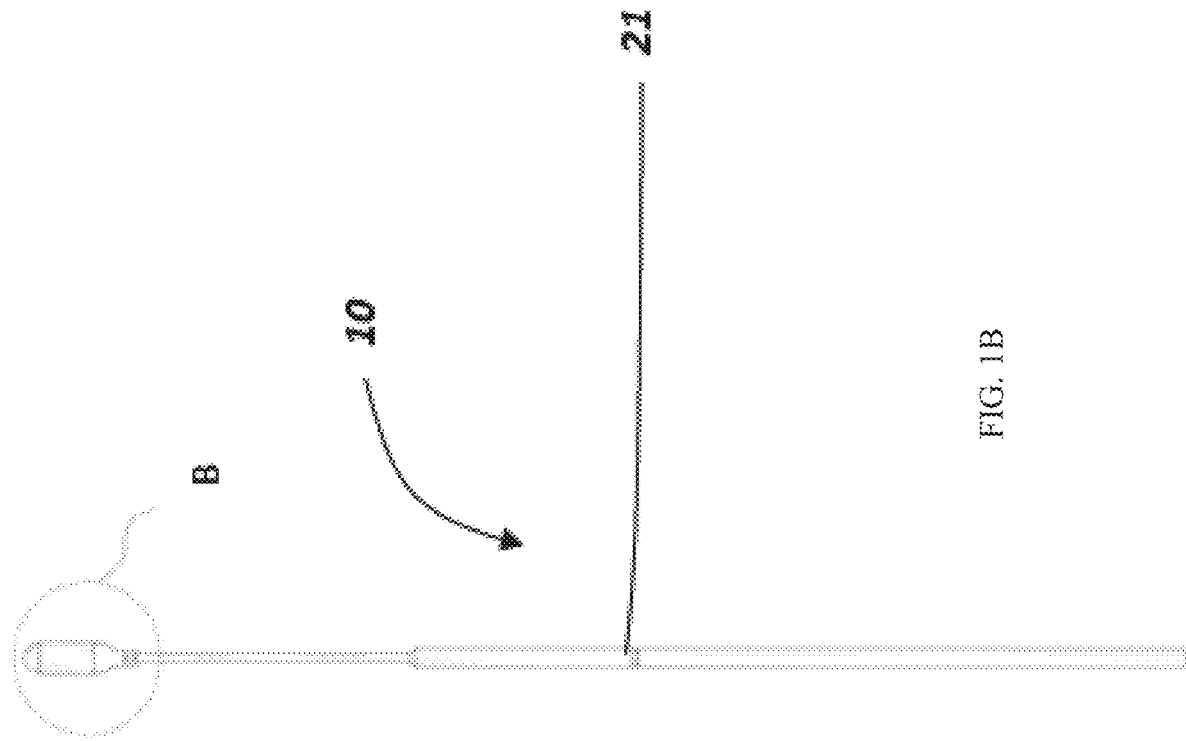
FIG. 1B is a 3D structure schematic diagram of flowing specimen collection in another specific example of the present invention.
Figure 1A:
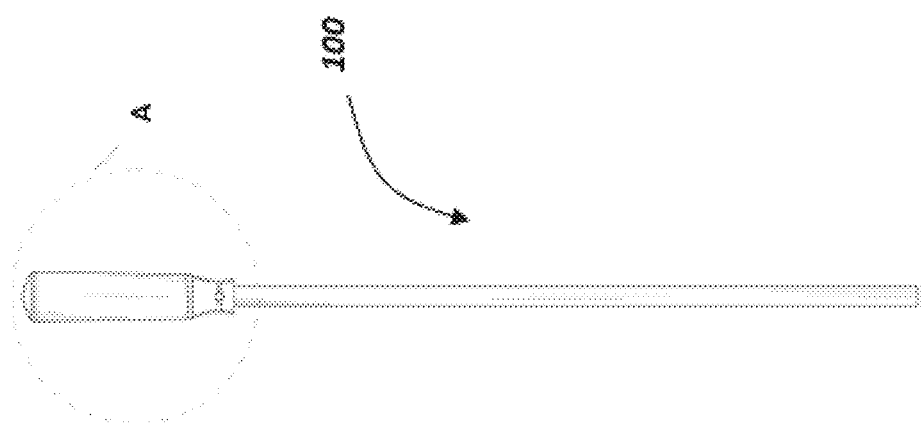
FIG. 1A is a 3D structure schematic diagram of fluid specimen collection in one specific embodiment of the present invention.

The structures involved in the present invention or the technical terms used will be further described below. If there is no special indication, they should be understood and interpreted according to the general terms used in the art.

Detection

Detection means assaying or testing for the presence of a substance or material, including, but not limited to, chemicals, organic compounds, inorganic compounds, metabolites, drugs or drug metabolites, organic tissue or metabolites of organic tissue, nucleic acids, protein or polymer. In addition, the detection also refers to testing of the quantity of tested substances or materials. Further, the assay also refers to immunoassay, chemical assay, enzymatic assay, etc.

Specimen

Specimens or samples in the present invention include biological liquids (e.g., case liquids or clinical samples). The specimens can be any liquid samples or fluid specimens, and they can be derived from solid or semi-solid samples, including excrement, biological tissue and food samples. The solid or semi-solid samples can be converted into liquid samples by any proper method, such as mixing, mashing, macerating, incubating and dissolving, or digesting through enzymolysis in a proper solution (e.g., water, a phosphate solution or other buffer solution). The "biological samples" include samples derived from animals, plants and food, such as urine, saliva, sputum, nasal mucus, secretions of the nasal cavity, blood and components thereof, spinal liquid, vaginal secretions, sperm, feces, sweat, secretions, tissues, organs, tumors, cultures of tissues and organs, cell cultures and media derived from humans or animals. Preferably, the biological sample is urine. Preferably the biological sample is saliva, preferably sputum, preferably secretions of the nasal cavity. The food samples include food processing materials, end products, meat, cheese, wine, milk and drinking water. The plant samples include samples derived from any plant, plant tissue, plant cell culture and media. The "environmental samples" are derived from the environment (e.g., liquid samples, sewage samples, soil samples, groundwater, seawater and waste liquid samples derived from lakes or other water bodies). The environmental samples can also include sewage or other wastewater.

Any above-mentioned specimen or sample can be collected by utilizing the proper collector in the present invention, the specimens include analyzed substances of interest, and the analyzed substances can be detected by using a detection element or a test element. Preferably, saliva, urine, nasal mucus, throat sputum, sweat and the like are collected by utilizing the collector of the present invention. After being collected, the specimens can be stored or transported to be used for subsequent detection so as to judge whether the specimens or the samples contain backup substances or not. The collector 100 or 10 of the present invention can be used for collecting the specimen in any form, whether initially solid or liquid, as long as the liquid or liquid specimens can be absorbed by the porous absorbing material.

Test Element

The "test element" refers to an element that can detect whether the specimen or the sample contains the analyzed substance of interest, which can be called as the test element. No matter what technical principle this detection is based on, immunology, chemistry, electricity, optics, molecular science, nucleic acid, physics, etc. can be used. The test element can be a lateral flow test strip which can detect various analyzed substances. Other proper test elements can also be applied to the present invention. The specimens collected by using the collector of the present invention can be directly detected by the test element to determine whether the specimen contains the analyzed substance or treated by treatment liquid and then detected by the test element to determine whether the specimen contains the analyzed substance.

Various test elements can be combined to be applied to the present invention. One form is the test paper or the lateral flow test paper. The test paper for analyzing the analyzed substance (such as a drug or a metabolite indicating a physical condition) in the specimen can be in various forms, such as an immunoassay or chemical analysis form. The test paper can adopt a non-competitive or competitive analysis mode. The test paper generally comprises a water-absorbing material with a specimen loading area, a reagent area and a test area. A fluid or liquid specimen is added to the specimen loading area and flows to the reagent area through capillary action. In the reagent area, if the analyzed substance exists, the specimen is combined with a reagent. Then the specimen continuously flows to the test area. Other reagents, such as molecules specifically combined with the analyzed substance, are fixed in the test area. The reagents react with the analyzed substance (if any) in the specimen and combine the analyzed substance in this area or combine with a certain reagent in the reagent area. There is a marker for displaying a detection signal in a marking area that might be separated from the reagent area.

The typical non-competitive analysis mode is that if the specimen contains the analyzed substance, a signal is generated, and if the specimen does not contain the analyzed substance, the signal is not generated. In the competitive mode, if the analyzed substance does not exist in the specimen, the signal is generated, and if the analyzed substance exists, the signal is not generated.

The test element can be the test paper, and can be made of a water-absorbing material or a non-water-absorbing material. The test paper can comprise multiple materials for liquid specimen delivery. The material of one test paper can cover another material, such as filter paper covering a nitrocellulose film. One area of the test paper can be made of one or more materials, and another area of the test paper can be made of one or more different materials. The test paper can be bonded to a certain support object or a hard surface to improve the strength of the test paper in holding.

The analyzed substance is detected by a signal generating system. For example, a composition of one or more signal generating systems is immobilized in an analyzed substance test area of the test paper by utilizing one or more enzymes that specifically react with the analyzed substance and by using a method for immobilizing a specific binding substance on the test paper. The signal generating substance may be in the specimen loading area, the reagent area, or the test area, or the entire test paper, and may fill one or more materials of the test paper. A signal substance containing solution is applied to the surface of the test paper or one or more materials of the test paper are immersed in the signal substance containing solution. The test paper to which the signal substance containing solution is applied is dried.

All areas of the test paper can be arranged in the following modes: the specimen loading area, the reagent area, the test area, a control area, an area for determining whether the specimen is adulterated or not, and a liquid specimen absorbing area. The control area is behind the test area. All the areas can be arranged on one test paper made of only one material. Or different materials are used in different areas. All the areas can be directly contacted with the liquid specimen, or the tail end of each area is connected and overlapped with the front end of another area according to the flowing direction of the liquid specimen. The used material can be a material with better water absorption, such as filter paper, glass fiber or the nitrocellulose film. The test paper can also be in other forms.

The commonly used reagent strip is a nitrocellulose film reagent strip, namely the test area comprises the nitrocellulose film (NC), and specific binding molecules are fixed on the nitrocellulose film to display a detection result. The commonly used reagent strip can also be a cellulose acetate film or a nylon film and the like. For example, they can be reagent strips or devices containing the reagent strip as described in the following patents: U.S. Pat. Nos. 4,857,453; 5,073,484; 5,119,831; 5,185,127; 5,275,785; 5,416,000; 5,504,013; 5,602,040; 5,622,871; 5,654,162; 5,656,503; 5,686,315; 5,766,961; 5,770,460; 5,916,815; 5,976,895; 6,248,598; 6,140,136; 6,187,269; 6,187,598; 6,228,660; 6,235,241; 6,306,642; 6,352,862; 6,372,515; 6,379,620 and 6,403,383. The test strips and the similar device with the test strip disclosed in the above patents can be applied to the test element or the detection device of the present invention to detect the analyzed substance, such as the analyzed substance in the specimen.

The detection test strips applied to the present invention can be generally lateral flow test strips, and the specific structures and detection principles of these detection test strips are well known to those of ordinary skill in the art in the prior art. The general detection reagent strip comprises a specimen collecting area or a specimen loading area, a marking area, a test area and a water absorbing area. The specimen collecting area comprises a specimen receiving pad. The marking area comprises a marking pad. The water absorption area can comprise a water absorbing pad. The test area comprises a necessary chemical substance capable of testing whether there is the analyzed substance, such as an immune reagent or an enzyme chemical reagent. The general detection test strip is a nitrocellulose film test strip, namely the test area comprises the nitrocellulose film, and specific binding molecules are fixed on the nitrocellulose film to display the test result. The general detection test strip can also be the cellulose acetate film or the nylon film and the like. Certainly, a test result control area can also be arranged at the downstream of the test area, and generally, the control area and the test area appear in a form of a transverse line, it is a detection line or control line. These detection test strips are conventional reagent strips, and certainly, the detection test strips can also be other types of test strips for detecting by utilizing capillary action. In addition, the general detection test strip is provided with a dry chemical reagent component, such as a fixed antibody or other reagents. When the general detection test strip is in contact with liquid, the liquid flows along the test strip by the capillary action, and the dry reagent component is dissolved in the liquid along with the flowing, the liquid entering the next area reacts with the dry reagent in this next area, thus the necessary test is carried out. The liquid flowing is mainly realized through the capillary action. The detection test strips can be applied to the detection device disclosed by the present invention, or are arranged in a test cavity to be in contact with the liquid specimen, or are used for testing whether the analyzed substance exists in the liquid specimen entering the test cavity or testing the quantity of the analyzed substance if the analyzed substance exists.

Besides, the test strip or the lateral flow test strip is essentially used for making contact with the liquid specimen to test whether the liquid specimen contains the analyzed substance or not.

The test element of the present invention can be essentially used as the detection device for detecting the analyzed substance in the specimen, therefore, the detection device herein is treated as the test element. For example, after the fluid specimen is mixed with the treatment liquid, the liquid specimen is directly detected by the test element. It will be described in detail below, the test element may be used alone for detection while describing a receiving device for processing the fluid specimen.

Analyzed Substances

Examples of the analyzed substances that can be used in the present invention include small molecules, including drugs (e.g., drug of abuse). "Drug of Abuse" (DOA) refers to the use of drugs for non-medical purposes (typically acting as paralytic nerves). Abusing these drugs may cause physical and mental damage, dependence, addiction, and/or death. The abused drugs include cocaine, amphetamine AMP (such as, Black Beauties, white amphetamine tablets, dextroamphetamine, dextroamphetamine tablets and Beans), methylamphetamine MET (crank, methorphamine, crystal, speed), barbiturate BAR (such as Valium□, Roche Pharmaceuticals, Nutley and New Jersey), sedative (namely, a sleep assisting drug), lysergic acid diethylamide (LSD), inhibitors (downers, goofballs, barbs, blue devils, yellow jackets, hypnone), tricyclic antidepressants (TCA, namely, imipramine, amitriptyline and doxepin), methylenedioxymethamphetamine (MDMA), phencyclidine (PCP), tetrahydrocannabinol (THC, pot, dope, hash, weed and the like), opiate (namely, morphine MOP or opium, cocaine COC, heroin and hydroxydihydrocodeinone), an anxiolytic drug and a sedative-hypnotic drug, wherein the anxiolytic drug is a type of drug which is mainly used for relieving anxiety, tension and fear, stabilizing emotion and has the effects of hypnosis and sedation, and includes benzodiazepines (BZO), atypical BZ, fused dinitrogen NB23C, benzodiazepines, ligands of a BZ receptor, ring-opening BZ, diphenylmethane derivatives, piperazine carboxylate, piperidine carboxylate, quinazolinone, thiazine and thiazole derivatives, other heterocyclic rings, imidazole/hydroxydihydrocodeinone (such as, Oxycodone (OXY), methadone (MTD), propylene glycol derivatives-Carbamates, aliphatic compounds, anthracene derivatives and the like. The detection device of the present invention can also be used for detecting whether the drugs are used for medical purpose and whether the medicines are taken too much, such as tricyclic antidepressants (imipramine or analogues), acetaminophen. These drugs can be metabolized into small molecular substances after being absorbed by the human body, and the small molecular substances exist in blood, urine, saliva, sweat and the like or part of the body liquid.

For example, the analyzed substances, detected by the present invention, comprise but are not limited to creatinine, bilirubin, nitrite, protein (non-specific), hormone (such as human chorionic gonadotropin, progesterone hormone, follicle stimulating hormone), blood, leucocyte, sugar, heavy metal or toxin, bacterial substances (such as protein or sugar substances aiming at specific bacteria, like *Escherichia coli* 0157: H7, *staphylococcus, salmonella, clostridium, campylobacter, L. monachogenes, vibrio* or cactus bacteria) and substances related to physiological characteristics in the urine sample, like pH and specific gravity, and also comprise some viruses.

The viruses include but are not limited to astrovirus, Bunya virus, California encephalitis virus, St. Louis encephalitis virus, West Nile virus, Japanese encephalitis virus, east equine encephalitis virus, west equine encephalitis virus, Venezuela equine encephalitis virus, Murray Valley encephalitis virus, chikungunya virus, tick fever virus, hemorrhagic fever virus, coxsackie virus A1-24, coxsackie virus B1-6, dengue fever virus 1-4, Duvenhage virus, east equine encephalitis virus, Ebola virus, ECHO virus 1-24, enterovirus 1-71, enterovirus coronavirus, Hantaan virus, hepatitis A virus, hepatitis C virus, E virus, Human Immunodeficiency Virus (HIV)1 and 2, respiratory coronavirus, rotavirus, T-lymphocyte virus, influenza virus A, influenza virus B, Junin virus, Lassa fever virus, measles virus, mumps virus, Norwalk virus, lymphocytic choriomeningitis virus, parainfluenza virus 1-4, poliomyelitis virus 1-3, rabies virus, respiratory syncytial virus, rhinovirus 1-113, Rocio virus, rubella virus, vesicular stomatitis virus, yellow fever virus and Zika virus.

The fluid specimen also comprises a nucleic acid or a nucleic acid fragment. The nucleic acid herein can be any RNA and DNA with genetic information. The term "nucleic acid" used in the present invention comprises one or more of the following types: polydeoxy ribonucleotide (containing 2-deoxy-D-ribose), polyribonucleotide (containing D-ribose) and any other type of polynucleotides, which is purine or pyrimidine bases or N-glycoside of modified purine or pyrimidine bases (including abasic site). The term "nucleic acid" in the present invention also comprises a ribonucleoside or deoxyribonucleoside covalent bonding polymer, wherein the covalent bonding is usually performed through a phosphodiester bond between subunits, but is performed through phosphorothioate, methylphosphonate and the like in some cases. The "nucleic acid" comprises single-stranded and double-stranded DNA and single-stranded and double-stranded RNA. The exemplary nucleic acid comprises but is not limited to gDNA, hnRNA, mRNA, rRNA, tRNA, miRNA, siRNA, snoRNA, snRNA, stRNA and the like, and any combination thereof.

Detection Device

The detection device refers to a device for detecting whether a specimen contains an analyzed substance or not. Immune, mass-spectrometric, electronic or nucleic acid amplification methods can be utilized, and any detection, assay and analysis devices which can be used for detecting the analyzed substance in the specimen can be used for testing the analyzed substance in the specimen collected by the collector of the present invention. The immune detection can be performed by using the lateral flow test strip or performed in other ways. For example, a device containing the test element can realize devices described by the technology, such as test strips or devices containing the test strips described in the following patents: U.S. Pat. Nos. 4,857,453; 5,073,484; 5,119,831; 5,185,127; 5,275,785; 5,416,000; 5,504,013; 5,602,040; 5,622,871; 5,654,162; 5,656,503; 5,686,315; 5,766,961; 5,770,460; 5,916,815; 5,976,895; 6,248,598; 6,140,136; 6,187,269; 6,187,598; 6,228,660; 6,235,241; 6,306,642; 6,352,862; 6,372,515; 6,379,620 and 6,403,383. These recorded devices can be used for detecting the analyzed substance in the specimen. The nucleic acid detection can be PCR amplification reaction detection, for example, a PCR product is generally used for sequencing analysis to determine a sequence and genome change, or is used for molecular cloning for functional analysis of a target sequence. The PCR method is modified for different measurement purposes. The followings are examples of various PCRs: reverse transcription PCR, quantitative PCR (qPCR), digital PCR (dPCR), multiplex PCR, nested PCR, allele-specific PCR, asymmetric PCR and isothermal nucleic acid amplification technology.

Porous Water-Absorbing Film

The porous water absorption refers to that there are a plurality of tiny pore diameters, the liquid specimen, or a specimen of a mixture of liquid and solid, or a specimen that the solid is dissolved by a solution can be absorbed through capillary action. The porous property refers the pore diameters for capillary action, or that large pore diameters contains small pore diameters, and the small pore diameters have capillary action. The porous material can be purchased from the existing commercial materials, such as filter paper, nylon films, nitrocellulose films, glass fibers, cotton and silk, or chemical fibers or fibers, or a mixture of any of the above materials, or obtained by physically or chemically processing one of the above-mentioned materials to obtain various materials. For example, in the filter paper processing process, basic materials of some other short fibers, such as cotton or glass fibers, are doped to support the mixing, and then, the basic materials are prepared into sheets 30 (FIG. 3C) through glue or other technologies, the sheets are porous or have capillary action, and can be used for absorbing the liquid specimen. The essence of the present invention is that the porous films or film sheets cover the end part of the rod-shaped element, thus the end part has water absorption. The essence of the present invention is different from the essence of a conventional mode of winding filaments and enabling the fibers at the end to be subjected to electrostatic treatment. It will be described below in detail.

In some embodiments, for the convenience of processing, when the porous water absorption is performed by means of a film, the line film (like cotton line) can be wound on the solid rod-shaped element to form a conical absorbing head, thus the liquid specimen is conveniently absorbed. These liquid specimens can be specimens in a fixed liquid form or specimens in a semi-solid form, and the specimens which can be absorbed by the porous film or bonded to the absorbing head can be considered as the specimens or the liquid specimens.

When an absorbing sheet is provided, a rigid rod-shaped element is coated with the glue, and then the absorbing sheet is bonded to the rod-shaped element through the glue to form the absorbing head. The absorbing head of the rod-shaped element generally cannot absorb water and can absorb water after being covered with the porous water-absorbing film which has water absorption. This mode is essentially different from a conventional mode depending on electrostatic adsorption fibers or flocking, and is also essentially different from a conventional mode of winding one or more line filaments on a solid rod-shaped element. For example, in the processing process, a porous absorbing film with a certain length can be provided, its thickness is 0.1-5 mm, and its length is determined by the perimeter of the head wound on the rod-shaped element, and can be 5 mm or 1 cm. If the end parts of two or more rod-shaped elements need to be wrapped at a time, the porous film can be 1 m or 2 m in length and the width is determined according to the length of the to-end-wrapped end parts of the rod-shaped elements, and can be 1 cm or 2-5 cm. The porous absorbing films are in a sheet shape, and a plurality of pores or capillary pores are formed in the sheet-shaped films and are used for adsorbing the liquid specimen. As shown in the FIG. 2B-2A, when one porous water-absorbing film is adopted to cover one end of a rod 102, a combination part 104 similar to a joint is formed at the contact position of the two ends of the sheet, it is a sheet 101. It can be understood that the sheet always has two ends, and when the thin sheet wraps the whole end part, there is always a joint between the two ends, and the joint can form a line similar to the joint. If two films are adopted to wrap an end part 107, the end part is defined by the two films, as shown in the FIG. 2B, the end part is defined by a film 1081 and a film 1082, naturally, two combination parts are formed when the end part is defined by the two films, and thus two combination lines 104 and 109 can be formed and are distributed on the two sides of the end part. There is also a combination line 105 on the top, and therefore the end part of the whole rod-shaped element can be wrapped. A preferable embodiment is that the two porous films are adopted to cover or wrap the end part, which facilitates the production and preparation. Certainly, there might be a situation that one film is used to wrap the end part, but the manufacturing is relatively complex, and the efficiency is not high.

Figures 2A, 2B:
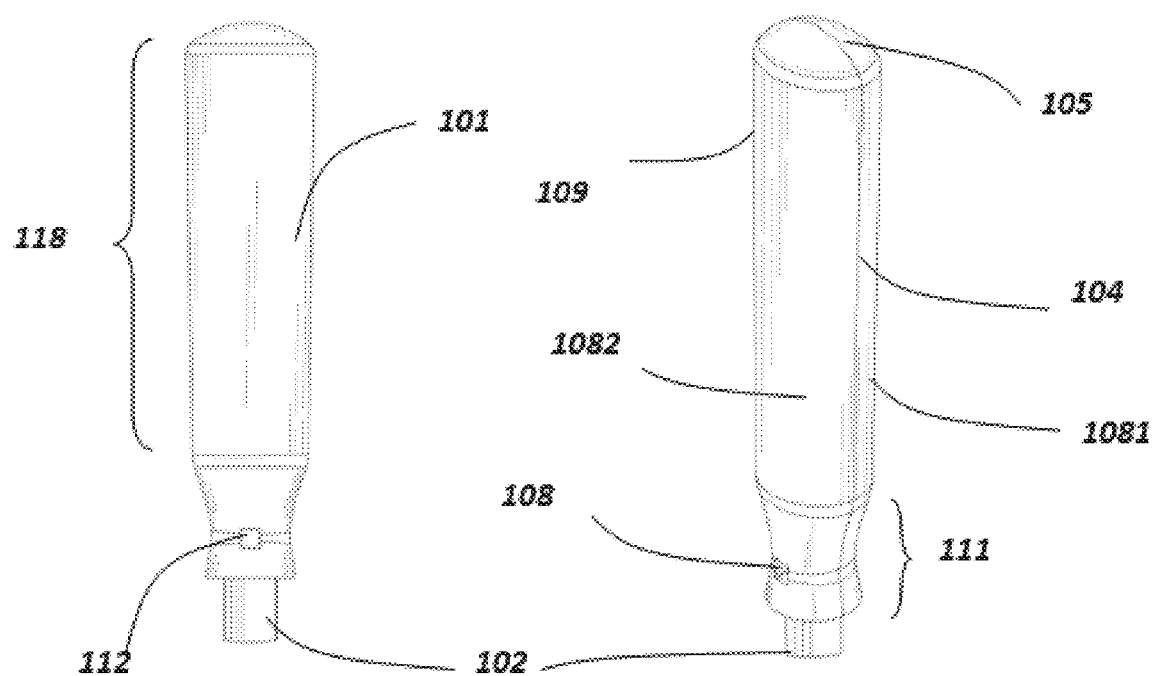
FIG. 2A is an enlarged structure schematic diagram (front side) of a part A in the FIG. 1 of the present invention.
FIG. 2B is a partially enlarged structure schematic diagram (3D) of a part A in the FIG. 1 of the present invention.
Figure 2C:
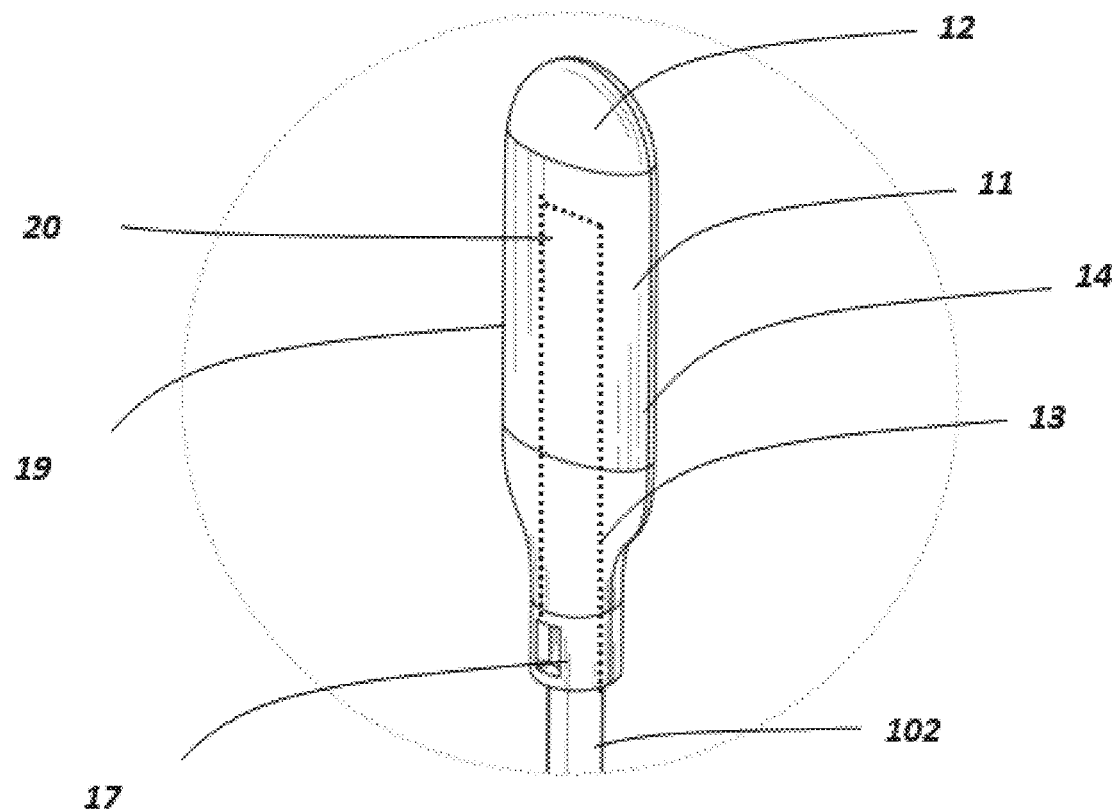
FIG. 2C is an enlarged structure schematic diagram (3D) of a part B in the FIG. 1B of the present invention.
Figure 2D:
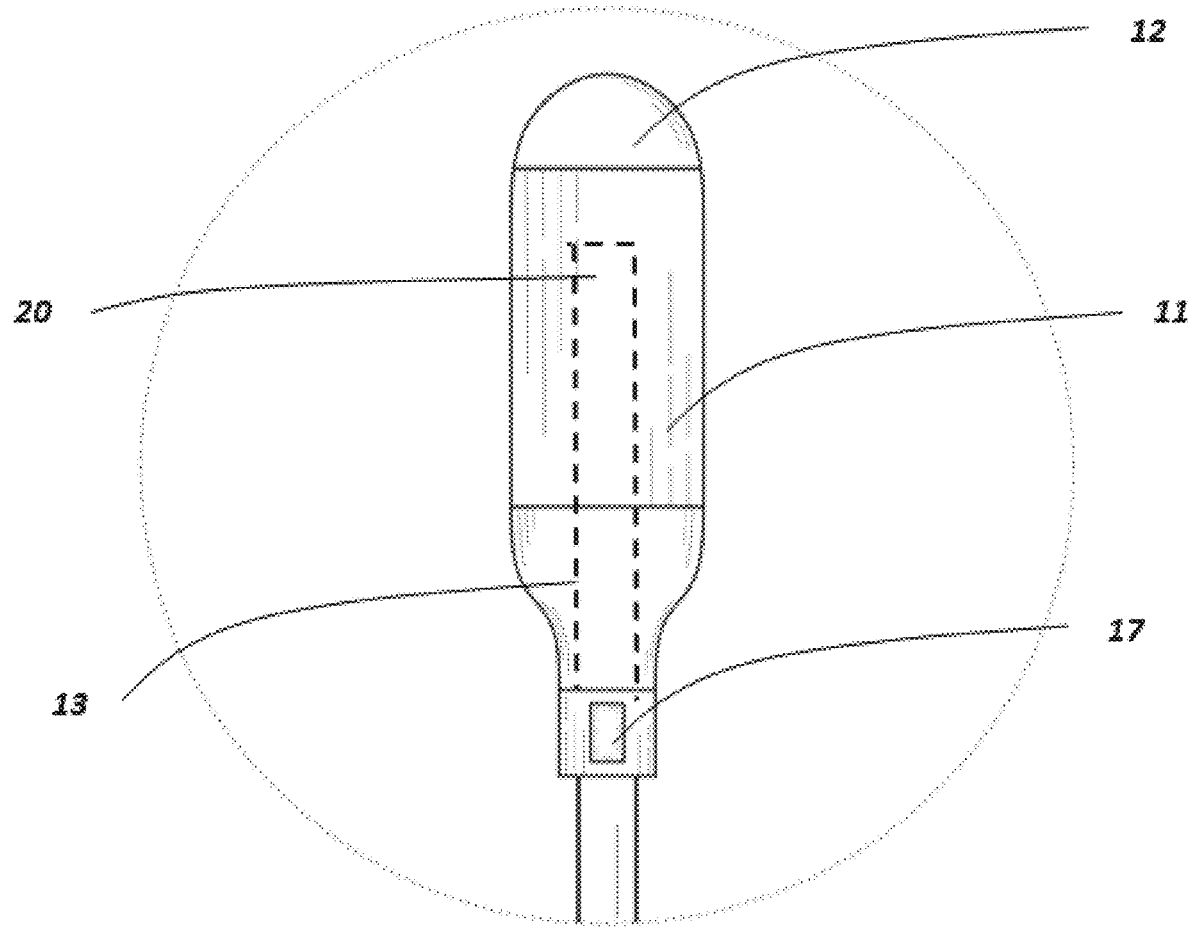
FIG. 2D is an enlarged structure schematic diagram (front side) of a part B in the FIG. 1B of the present invention.
Figure 2E:
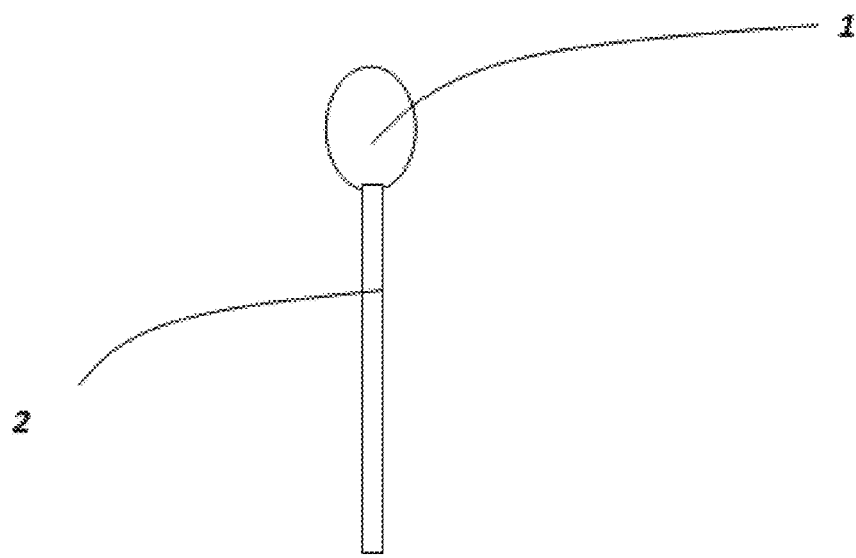
FIG. 2E is a 3D structure schematic diagram of a collecting device in another specific example of the present invention.
Figure 3A:
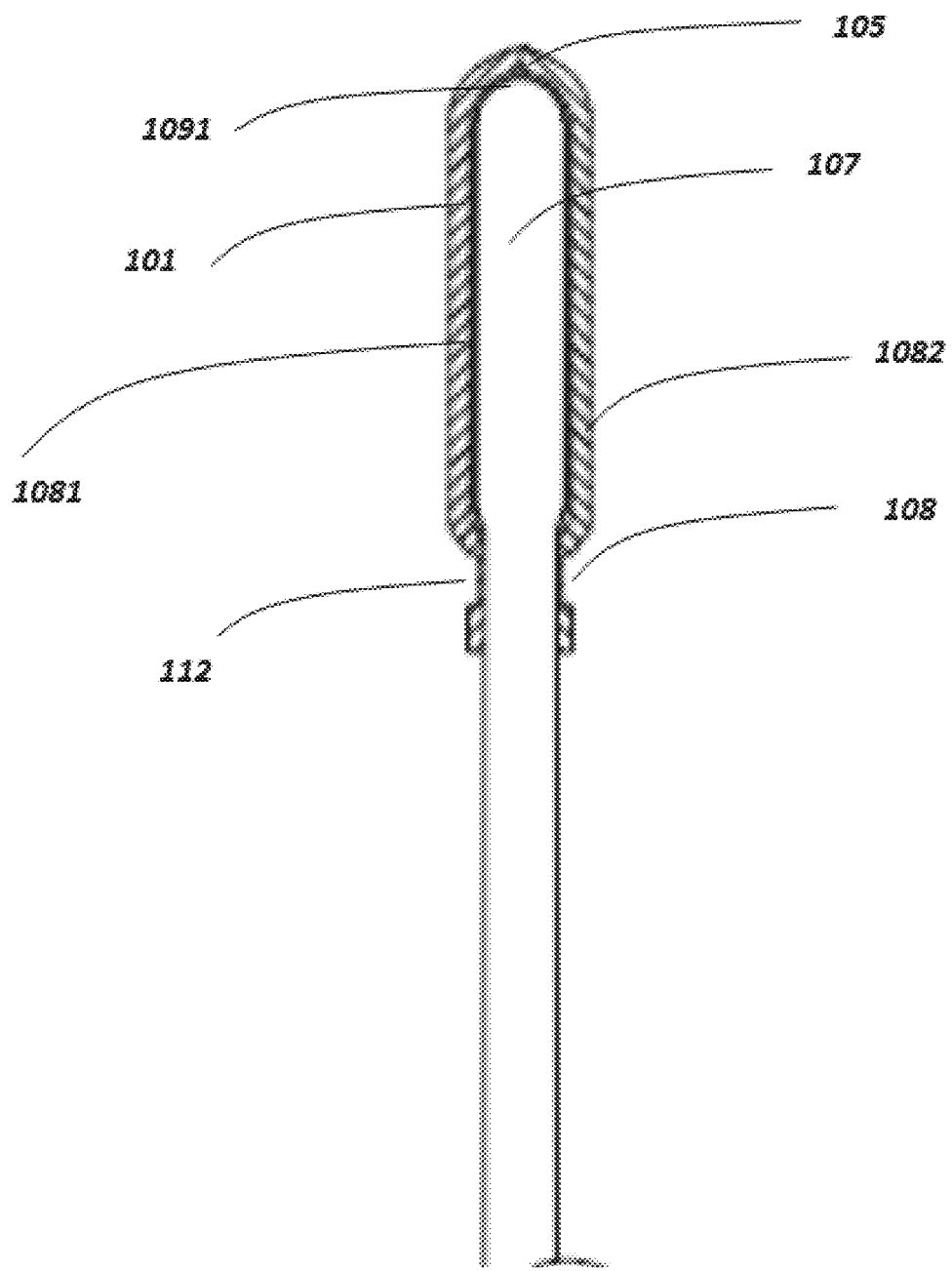
FIG. 3A is a cross-sectional structure schematic diagram (a structure shown in the FIG. 1A) of fluid collection in one specific embodiment of the present invention.
Figure 3B:
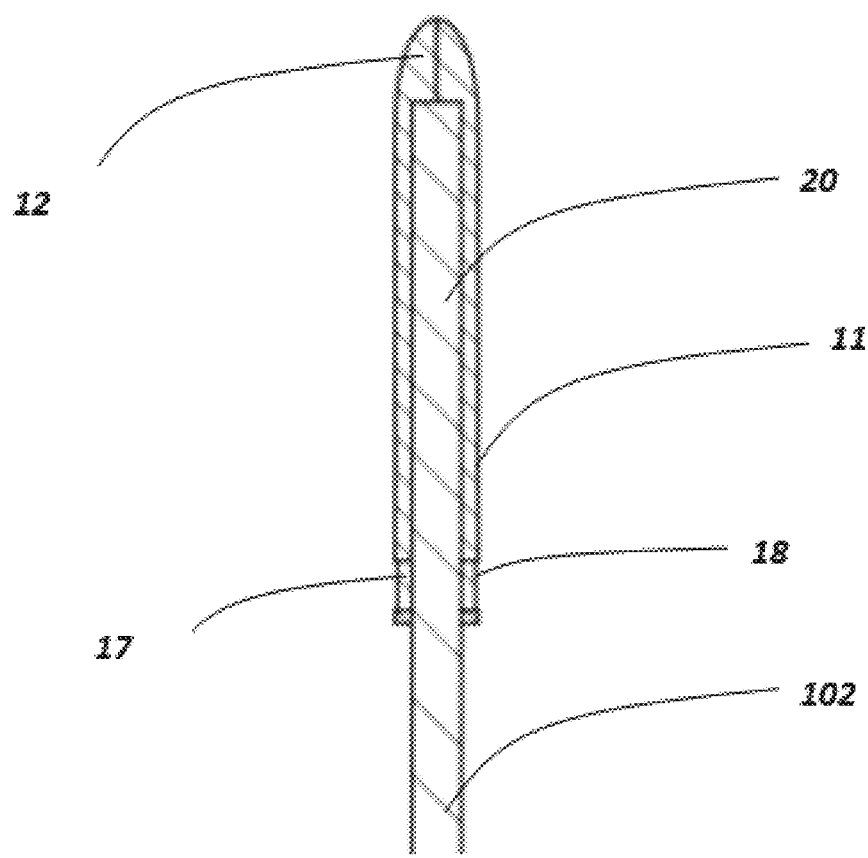
FIG. 3B is a cross-sectional structure schematic diagram (a structure shown in the FIG. 1B) of fluid collection in one specific embodiment of the present invention.
Figure 3C:
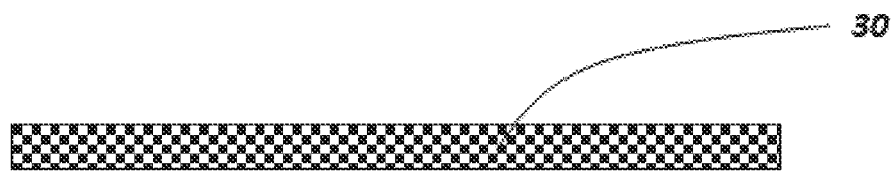
FIG. 3C is a cross-sectional structure diagram of a layer of porous water-absorbing material in one example.
Figure 3D:
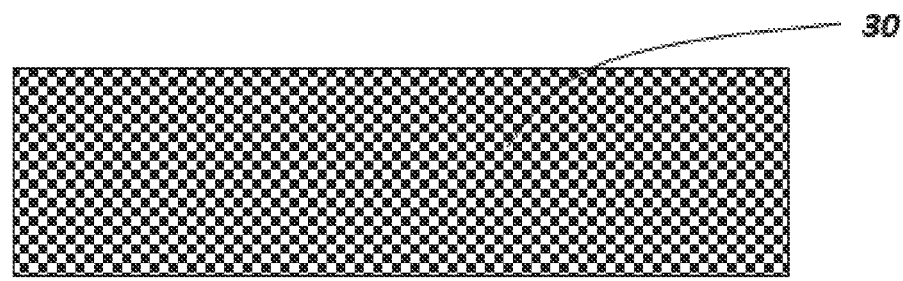
FIG. 3D is a top view of a layer of porous water-absorbing material in one embodiment.

FIGS. 2A and 2B, 3A show a detail embodiment that: the film basically and completely covers the surface of the rod-shaped element. In view of the appearance, a layer of porous film covers the end part of the rod-shaped element, or it can be considered that a layer of porous film is additionally arranged on the surface of the end part according to the shape of the end part of the rod-shaped element, and the thickness of the added layer is the thickness of the porous film, therefore, the shape of the end part can be directly judged from the whole appearance. In some cases, the porous water-absorbing film is not required to completely and directly cover the surface of the end part. The mode can be diversified, for example, a plurality of porous water-absorbing films can be extended outwards on the top, as shown in FIG. 2C, although the porous film wraps the end part of the rod-shaped element, a part of the porous film at an end part 20 does not directly covers a top end of the end part 20, but an additional part 12 is extended to the top end. The additional part has the advantage that: when collecting the specimen, particularly when extending into the organ to sample, the front end keeps the flexibility and soft, and the organ cannot be damaged due to the rigid end part. The end part 12 has a buffering effect. As shown in FIG. 2C, the rest part of the porous film 11 loosely sleeves the outside of the rod-shaped element, rather than totally covering the surface of the end part. Two of these porous films also enclose a whole collecting head. The advantages of this embodiment are that when the device is used for collecting specimen from children organs such as nasal cavities and oral cavities, the rod-shaped element sleeved with the porous water-absorbing film is thin and is wrapped with a loose film, so the oral cavities or the nasal cavities of children cannot be injured. It can be understood that when the device needs to extend into the oral cavities or the nasal cavities of children (2-5 years old) or infants (0.6-2 years old), the children or infants may not accept, in such case, a small-size collector as shown in FIG. 2C can be adopted, the soft porous film protects the rod-shaped element and the internal space surrounded by the porous film is larger than or far larger than the diameter or the perimeter of the rod-shaped element, thus the rigid rod-shaped element can be prevented from injuring people to the maximum extent. By adopting such design, in order to prevent a porous water-absorbing sleeve from falling off, a bonding point 17 is arranged on the absorbing head, and the porous film is bonded to the rod-shaped element through the bonding point, it is necessary to prevent the porous water-absorbing sleeve from falling off. It can be stated that the surface of the rod-shaped element cannot be coated with glue. The bonding point can be realized through glue or a heating melting mode. The bonding point can be symmetrical bonding points 18 and 17, or a plurality of bonding points for bonding, and the bonding points can be positioned at the tail end of the absorbing end instead of the top end. In some embodiments, the tail end of the porous water-absorbing end part is provided with a contraction area 13, and the contraction area is used for preventing the porous film which sleeves the rod-shaped element from falling off. In view of the appearance, the water-absorbing end parts shown in FIGS. 2C and 2D are in a flat shape, or they can be in any other proper shape. For example, FIG. 2E shows the shape of a rod-shaped element 2, the rod-shaped element is provided with an enlarged end part 1, the end part comprises the porous water-absorbing film, and the rod-shaped element and the enlarged end are designed like a "neck". When the porous film is used for wrapping, due to the limitation of the shape, the film including the film at the end part can be prevented from falling off, and at the moment, it is not necessary to use the bonding point or perform melting bonding.

In some embodiments, these absorbed specimens, such as liquid specimens, can be directly extruded to be released from the water-absorbing film, and the released specimens can be directly used for detecting whether the specimens contain analyzed substances of interest or not. Or, the porous films with the liquid specimens are soaked in the treatment liquid, and therefore the specimens on the water-absorbing film can be eluted into the treatment liquid. The treatment liquid herein can be any liquid capable of improving the overall detection effect, for example, the treatment liquid can dissolve and elute the samples adsorbed on the porous films, or remove some impurities, or the treatment liquid contains some organic or inorganic salt components which can re-fuse or crack the analyzed substance (if any) so as to obtain specific components, such as fragments or specific structures, suitable for a detection system. E.g., when detecting the virus specimen, viruses are dissolved and released from the specimen, cracked into antigens or virus fragments through the treatment liquid and then enter the detection devices along with the liquid to be tested, and these detection devices can be any device, such as a lateral flow immunodetection device, a nucleic acid amplification device like a PCR instrument, and can also be a fluorescence detection device and other proper devices used for detecting. Certainly, the treatment liquid may contain some reagents capable of improving the overall detection effect, such as PH adjusting reagents or buffering reagents, and these reagents enable the analyzed substances of interest in the specimen to be better detected by the detection devices.

In some embodiments, in order to achieve better large-scale industrial production, two films are generally adopted and subjected to a mold pressing mode. When two porous water-absorbing films are subjected to mold pressing, in order to enable the two films to completely cover the end part of the rod-shaped element and completely wrap the end part of the rod-shaped element, as shown in FIG. 3A, the porous water-absorbing films 101 have a certain thickness and completely wrap the end part 107 of the rod. When adopting this mode to absorb the liquid specimen, especially when the entering the organs, such as the nasal cavity, the oral cavity or the throat, of the human body to absorb the specimen, one layer of porous water-absorbing film completely wraps the end part 107 and has certain thickness, thus people can feel comfortable and safer. In some embodiments, the porous water-absorbing film has certain flexibility or elasticity, so when going deep into the organs for sampling, the film can absorb the specimen, such as saliva, sputum of the throat or liquid of the nasal cavity, and meanwhile, it can make people feel more adaptive and comfortable or reduce the tolerance due to its flexibility or elasticity or compressibility.

In some embodiments, the collecting device comprises a rod-shaped element, wherein the head or end part of the rod-shaped element is encircled by two porous films, and the porous films cover the head of the rod-shaped element. In some embodiments, the two porous films are provided with bonding lines or sewing lines through which the two films can be connected together. For example, as shown in FIGS. 2A-2B, the rod-shaped element 102 is provided with the end part 107, and the end part is provided with a first porous film 1082 and a second porous film 1081 which are connected together through a bonding line 104. The above-mentioned bonding lines or the sewing lines enable the two films to wrap the end part of the rod-shaped element 102 through an industrial machine or manually. The bonding line or the sewing line comprises a sewing line or a bonding line 105 of the head, and also comprises sewing lines or bonding lines 104 and 109 on the side surface of the end part, thus the two porous films form a complete porous water-absorbing material. The "sewing" refers to a mode for connecting the two water-absorbing films together, similar to a mode for sewing clothes by a sewing machine, and the mode is also feasible in the connecting mode of the present invention. In some preferred embodiments, the bonding mode is a preferred and more convenient. The two films can be bonded together in any mode, such as bonding by glue, and bonding in a thermoplastic packaging way. In the glue bonding mode, the boundary needing to be sewed is coated with glue, and then the two films are bonded together. In the bonding process, the end part of the rod-shaped element is located between the two porous water-absorbing films, the upper and lower films wrap the rod-shaped element, the contact position between the two sides are coated with the glue, and thus the two films are bonded together to form the bonding lines 104 and 105 and the bonding line 109 symmetrical to the bonding line 104. In some embodiments, in order to prevent the completely-bonded porous water-absorbing films from falling off the end part of the rod-shaped element, one mode can be adopted as that the outer surface of the end part is coated with a layer of glue, or the outer surface of the end part 107 is coated with the glue, when the two porous water-absorbing films wrap the end part to form the bonding lines or sewing lines, the inner surfaces of the films are bonded to the outer surface of the end part of the rod-shaped element through the glue, and therefore a complete absorbing head is formed, the two films are provided with a joint which in a joint line-like form. Another mode can be adopted as that the outer surface of the end of the rod is not coated with the glue, because toxic substances are possibly contained after glue coating, when the absorbing head penetrates into the human organ to absorb the specimen, the human health is damaged due to the effect of glue, and moreover, if the rod-shaped element is stored for a long term after glue coating, the bonding function is lost due to oxidation of glue, and the risk that the porous water-absorbing films fall off is caused.

In some embodiments, in order to avoid using the glue for bonding, a fixing structure for fixing the film on the surface of the rod-shaped element is arranged on the absorbing head, so the porous water-absorbing film is prevented from falling off. In some embodiments, the fixing structure can be that, for example, a contraction area is arranged at a part 111 far away from a top 1091 of the water-absorbing end part of the rod-shaped element 102, the area is contracted in a mold pressing manner, the contracted part covers the surface of the rod-shaped element, and thus the whole absorbing material or the porous water-absorbing film can be prevented from falling off. The "contraction" can be an additional part, and the additional part is smaller or thinner than other parts covered with the film. Generally, the porous water-absorbing film has a certain thickness, when the porous water-absorbing film covers the outer surface of the rigid rod-shaped element, other parts 118 keep soft or flexible in a basically natural state, and the film at the contracted part keeps a tensioned state, therefore, the contracted part 111 is more tightly attached to the surface of the rod-shaped element in a tensioning manner, and the falling-off prevention effect can be achieved by virtue of inherent friction force. Certainly, the fixing structure can also be an elastic ring, for example, an elastic ring (not shown) is additionally arranged, when the porous film covers the rod-shaped element, the elastic ring sleeves the contraction part, and the porous film at the contraction part is fixed on the surface of the rod-shaped element through the elastic ring, thus the whole porous film can be prevented from falling off from the rod-shaped element. The rod-shaped element is a rod-shaped element with a uniform and smooth outer surface, it is also the cheapest and most economical form, and the basic situation is that the diameter of the rod-shaped element covering the porous film is substantially the same as that of the contraction part. Certainly, the fixing structure can also be that if some designs are performed on the rod-shaped element, for example, fixed bulge structures are arranged on the rod-shaped element, the bulge structures are designed at the contracted part 111, and when two films 1082 and 1081 cover the rod-shaped element, bulges (not shown) at the contracted part can penetrate through the soft films to fix the whole films so as to prevent the films from falling off from the rod-shaped element. Moreover, in some embodiments, the maximum diameter of the end part 107 with the porous water-absorbing film is larger than the diameter of the contraction part, the contraction part is designed like a neck part, and when the porous film is on the end part 107, the porous film also covers the neck part 111, thus the porous film covering the surface of the rod-shaped element can be prevented from falling off through the shape of the rod-shaped element, and the "contraction or neck part" plays a role of the fixing structure. In other embodiments, the fixing structure is a hot-pressing melting point, the porous water absorption material is compressed to be melted by a hot pressing head, and the melted glue-like substance is bonded on the surface of the rod-shaped element, so the porous water-absorbing film can also be prevented from falling off.

Therefore, in some embodiments, the porous water-absorbing film is a porous sponge film which has a melting point of 150-200° C. In the production process, when the end part 201 of the rod-shaped element is wrapped by an upper film 30 and a lower film 31, a bonding point 108 or 112 of the sponge is melted in a hot pressing mode, and the melted sponge has the property of bonding and can be bonded to the surface of the rod-shaped element, so that the fixing effect is achieved. Only the hot-pressed parts of the two points 108 and 112 or one point can be bonded to the surface of the rod-shaped element, and the other parts only cover the outer surface of the end part 107 of the rod-shaped element, therefore, the glue is prevented from coating the surface of the rod-shaped element. It just like the hot pressing mode, a concave-like part is formed in the end part, and the concave part is the bonding point which is melted by hot pressing. In light of another aspect, if the glue is required, the processing procedure is increased, and the production cost is also increased.

Porous Sponge Film

In some embodiments, the porous film is made of porous sponge. The porous sponge is generally obtained by foaming, and the foaming process can control the size of multiple pores according to the existing process. The porous sponge has the following advantages: 1, the porous size can be greatly controlled so that the number or density of multiple pores per unit volume of the sponge can be controlled; and 2, the sponge has elasticity and softness, can fully absorb liquid when being used for absorbing the liquid, and can directly extend into the human organ for direct sampling without making people feel uncomfortable or causing harm to the human body. As described above, when the sponge is used as the device for absorbing the specimen, no glue is adopted, and additional harmful substances are avoided, and the use is safer; and moreover, due to the one-layer or multi-layer sponge, fragment falling off is generally avoided, so it has greater advantages compared with a conventional flocked swab. For example, FIG. 19 shows a flocked swab produced by a conventional electrostatic adsorption mode, short fibers 150, such as fibers with the length of 1-5 mm, are directionally sorted under the action of an electric field and are adsorbed to a surface 152 of the rod-shaped element in an electrostatic mode, and in order to enable flocking fibers 153 to be more stably bonded to the surface, the glue needs to coat the surface of the rod-shaped element, and then stable bonding can be realized. A production or manufacturing mode of the specimen absorption device of the present invention is substantially different from a conventional mode as shown in the FIG. 19. In addition, in the using process of the conventional flocked swab, the short fibers might fall off from the surface of the rod-shaped element, and the fallen fibers may cause damage to the human body, especially to people sensitive to the fibers; when the flocked swab is directly adopted to penetrate into the oral cavity or the throat or the nasal cavity to take the specimen, the fallen fibers may enable people to feel uncomfortable or difficult to breathe (especially to people sensitive to the fibers, like asthma patients) in the sampling process. The other defect of using the conventional flocked swab is that the fallen fibers might directly influence the subsequent detection process or detection result. After the flocked swab is inserted into the liquid for treatment after sampling, it is generally required to be extruded, and then the treatment liquid is added into a test device; there are fallen fibers in the liquid, when a lateral flow test is adopted for detection, a "line breakage" phenomenon is often found in a T line (detection line), which directly affects the reliability of the result because the "line breakage" phenomenon is a key quality index in transverse immunity test paper. 20-35% of different degrees of "line breakage" phenomenon is found in detailed experiments. On the contrary, when the sponge swab (provided by the present invention) is adopted, a layer of porous sponge covers the surface of the rod-shaped element, short fibers do not fall off, thus the "line breakage" phenomenon is reduced, and only 5-10% of line breakage is probably caused. The "line breakage" phenomenon occurs in a detection line area, accumulated marking substances are not uniform, there are no accumulated marking substances at some places, and these places have the color (white) the same as the background, consequently, the T line is incomplete in appearance. If other subsequent specimen treatment is performed, a pipeline of an instrument is possibly blocked. If a plurality of micro-channels are used for detection, the micro-channels are only micron-sized in width, and the fallen fibers will cause blockage of the channels.

Moreover, the sponge treated as the porous absorbing material facilitates the processing and production. The sponge has a melting point temperature, which is generally 100-180° C. or 200° C., and the sponge can be melted at this temperature, so the bonding lines 104, 105 and 109 are arranged at the joint of two pieces of sponge on the collecting device of the present invention, and these bonding lines are the lines which are heated and melted for bonding due to the contacting of the two pieces of sponge. Actually, the lines are the traces of fusion bonding. The melting bonding mode is generally completed by a mold, and it will be described in details later.

The porous sponge can be obtained by various modes, for example, the sponge can be directly purchased commercially, or the sponge required by the present invention can be independently prepared by the foaming technology, or the sponge can be acquired in a customized mode. The foaming is actually a method for producing porous water-absorbing sponge, and the common sponge is made of wood cellulose fibers or foamed plastic polymers. In addition, there is natural sponge made of sponge animals, and most of the natural sponges are used for body cleaning or drawing. Moreover, there are three types of sponge made of other materials, namely low-density polyether (non-water-absorbing sponge), polyvinyl alcohol (high-water-absorbing material without obvious pores) and polyester. The foaming process is also the prior art, for example, foaming resin, a foaming aid and adhesive resin (enabling the finished product to have bonding property) are mixed together; and foaming processing is carried out, namely, 80 parts of ethylene vinyl acetate (EVA), 20 parts of APAO PT 3385, 20 parts of azodicarbonamide, 19 parts of CaCO and 0.6 part of dicumyl peroxide are mixed together, the mixture is placed in the mold for foaming, and closed pores are broken by mechanical force, thereby obtaining the foaming sponge. The density (d) of the foaming sponge is generally 0.028 g/cm, and 25% compression hardness is 1.9 KPa. It just like foaming, different objects can be manufactured by different manufacturing processes with the same material. The foaming process can refer to a solution described in a Chinese patent with patent publication number of CN110774604B, and any technology in the patent specification can be treated as an specific embodiment for preparing the foaming sponge in the present invention. The production process of the foaming sponge can refer to any technical solution disclosed by a Chinese patent application with the publication number of CN107553920A, the patent application specifically discloses a method for forming pores in foaming sponge, and the foaming sponge produced by the method disclosed by the patent application can also be used as the porous water-absorbing sponge of the present invention to prepare the sampling device or the sampling sponge swab of the present invention.

There are many kinds of sponges used in industrial production, including foaming sponge, sizing sponge, rubber sponge, memory sponge and the like. The foaming sponge is generally used as the porous water-absorbing material of the present invention. The foaming sponge is formed by foaming polyether, like foaming bread. Mechanical equipment can be used for foaming, or wood boards are used for manually surrounding to foam. The foaming sponge is just like a piece of square large bread, a slicing machine is used for slicing the sponge with thickness meeting different requirements, and the hardness of the foaming sponge can also be adjusted. The density of sponge herein is generally 25-28 kg/m$^3$, and the density of 20-22 kg/m$^3$ is adopted in other conditions. Although the hardness and the density of the sponge have a direct relation, the hardness also has a relation with different additive formulas, so the sponge is divided into high-elasticity, grey ultrasoft, black grey ultrasoft and soft types in the industry. When designing and using a product, the sponge should be reasonably and scientifically provided according to different shapes and structures, and the sponges with different elasticity and density are generally provided for the upper, middle and lower parts. There is a fireproof sponge material (flame-retardant sponge), it is that before the sponge is foamed, a fireproof agent such as chlorine and bromine is added into the material formula so that dense smoke can be extinguished in case that the sponge catches a fire, and thus a flame-retardant effect is achieved.

Usage Method

When using the sample collector provided by the present invention, such as the collector shown in FIG. 1A-1B or FIG. 2A-2E, an absorbing head A or 118 of the collector is used for absorbing the specimen, the porous sponge is provided with the porous film, so the liquid or liquid-solid mixture can be adsorbed or absorbed by the porous film through the capillary action or other physical actions. The specimen in the present invention can be any specimen, such as any previously defined specimen, and the specimen contain the previously defined analyzed substances. In some embodiments, the collector shown in FIG. 1B can be used for collecting the specimen. After the collection is finished, a collection head B can be inserted into a container for storage. In the storage process, the collection head B can be transported or transferred, such as transporting to a professional laboratory for test. The collection place can be roadside, a bedside and the like. In order to facilitate transportation, the collector is provided with a breaking part 10, after the collection is finished, a breaking part 21 is broken, and the collection head can be kept in the container. In some embodiments, the collector provided by the present invention can be used for collecting the secretions in the oral cavity, throat and nasal cavity, such as saliva, sputum or secretions in the nasal cavity, and the secretions may contain analyzed substances of interest, such as drug micromolecules, virus particles, bacteria or fungi. After the collection is finished, the collection head, namely one end, wrapped with the porous adsorbing film, of the rod-shaped element is inserted into the container, and the container can be filled with the treatment liquid in advance. The treatment liquids can be used for eluting, dissolving and diluting the secretions absorbed by the porous adsorbing film, or cracking viruses, bacteria and fungi. After the treatment is finished, the treatment liquid can be transferred to the next detection procedure, such as re-treatment or filtration or direct detection by any detectable reagent like a lateral flow test strip, a nucleic acid amplification reagent, an enzyme-linked immunosorbent assay (ELISA), a mass spectrometry, liquid chromatography-mass spectrometry, and gas chromatography-mass spectrometry.

Manufacturing Device and Manufacturing Method

Figure 10A:
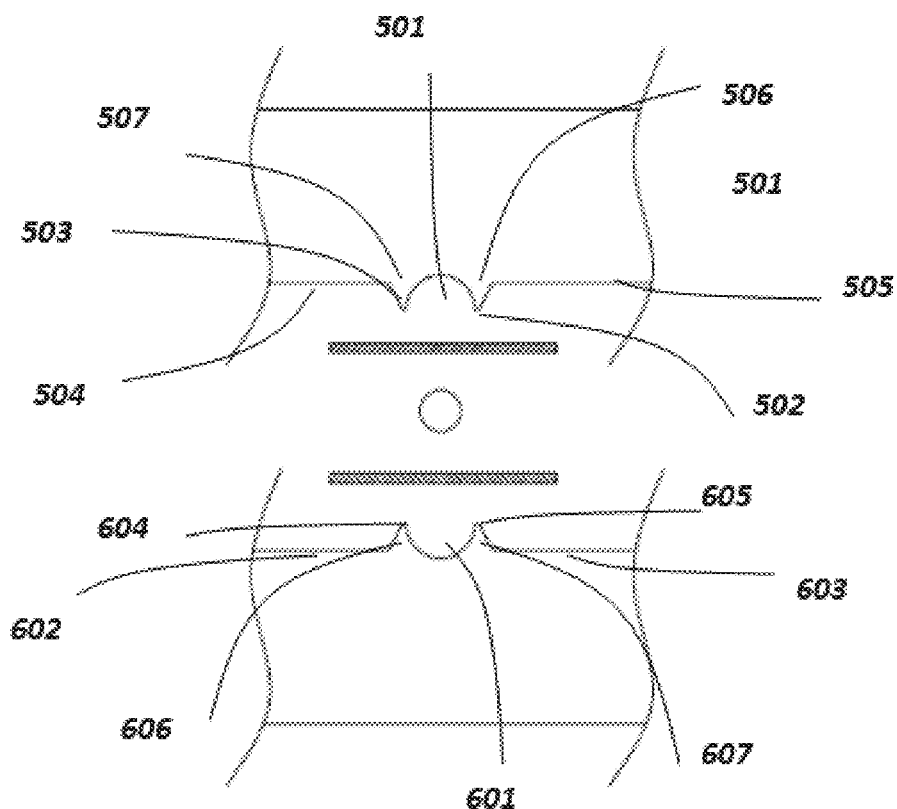
FIG. 10A is a schematic diagram of a cross-sectional structure of an upper mold and a lower mold in a manufacturing process (step 1).
Figure 10B:
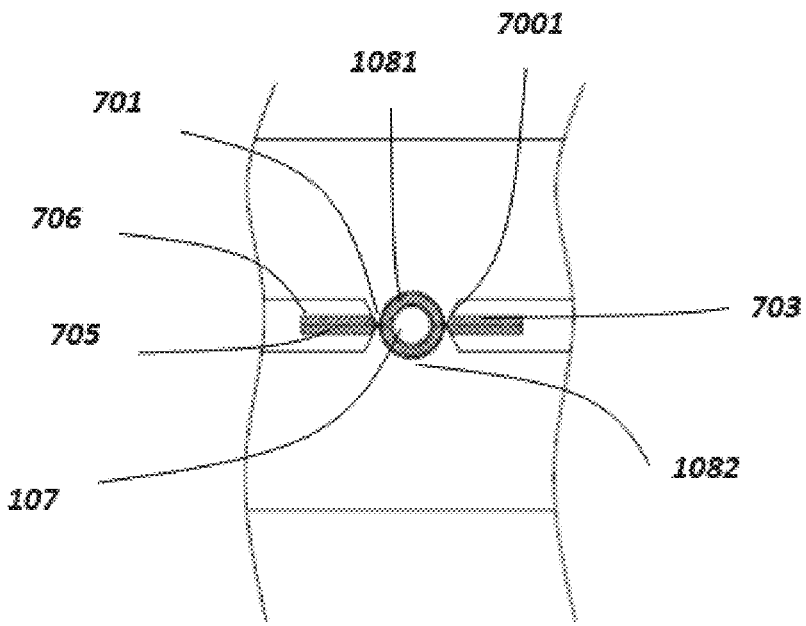
FIG. 10B is a schematic diagram of a cross-sectional structure of an upper mold and a lower mold in a manufacturing process (step 2).
Figure 10C:
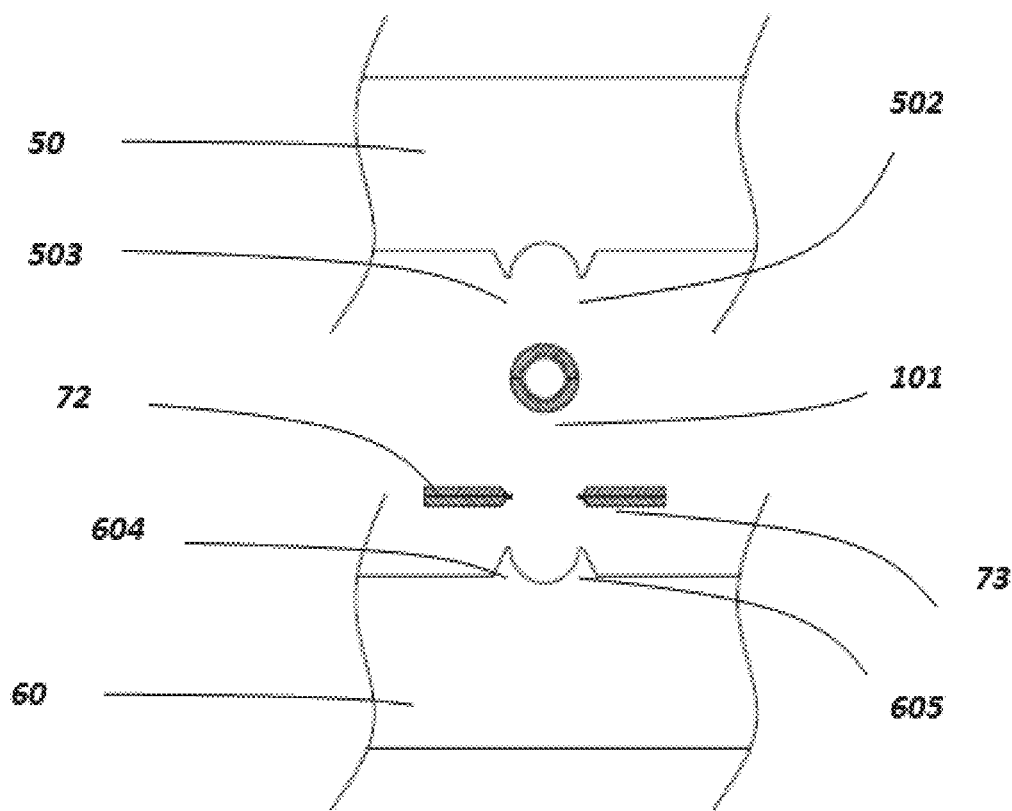
FIG. 10C is a schematic diagram of a cross-sectional structure of an upper mold and a lower mold in a manufacturing process (step 3).
Figure 13:
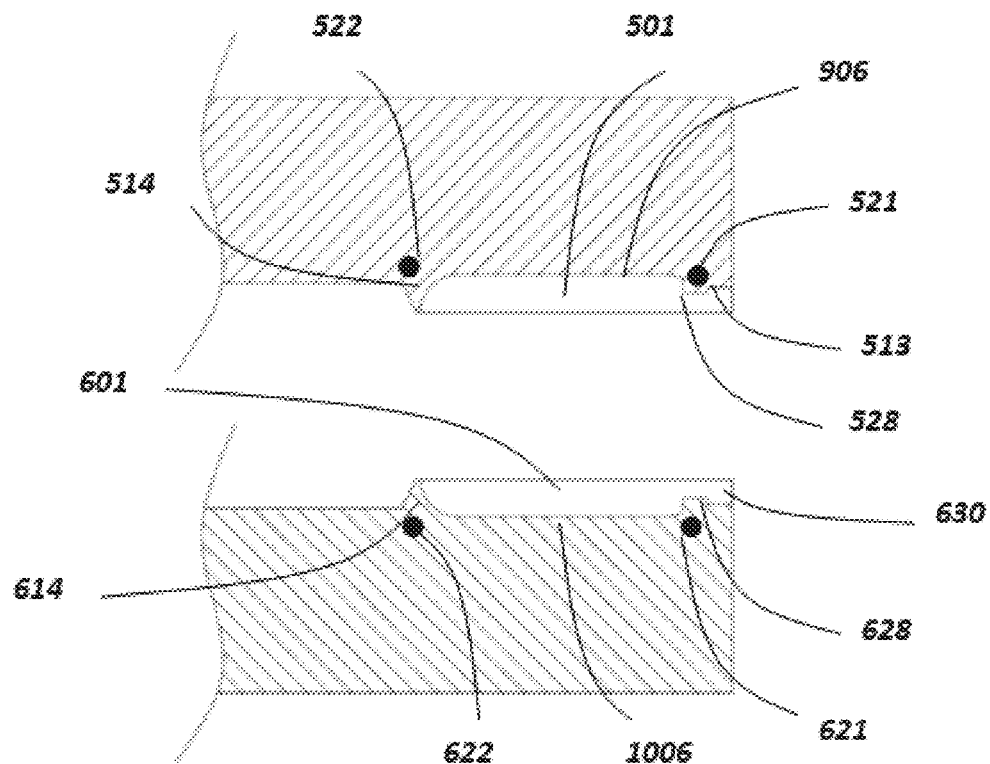
FIG. 13 is a schematic diagram of a cross-sectional structure of A-A' of an upper mold and a corresponding lower mold.

In some embodiments, the present invention provides a device for manufacturing the collector. By adopting the device of the present invention, the collector, particularly the collector with the bonding line or the sewing line, can be automatically and quickly manufactured. In some embodiments, the device of the present invention comprises an upper mold 50 (or a first mold) and a lower mold 60 (a second mold), wherein the upper mold comprises a mold cavity 501 capable of accommodating a part of the rod-shaped element; the lower mold comprises a lower mold cavity 601 capable of accommodating a part of the rod-shaped element; when the two downward mold cavities are combined or closed, the upper and lower mold cavities 501 and 601 substantially wrap or seal the rod-shaped element by surrounding; and the end part of the rod-shaped element is accommodated in a space formed by the two mold cavities. In some embodiments, each of the upper and lower mold cavities comprises a cavity body 501 and walls 906 and 1106 surrounding the mold cavity (as shown in FIG. 13). The shapes of the walls surrounding each mold cavity can be adjusted at will according to the shape of the rod-shaped element. If the rod-shaped element is cylindrical, the upper and lower mold cavities can be semicircular, thus the rod-shaped element with a circular cross section can be wrapped when the upper and lower mold cavities are combined or closed, as shown in FIGS. 10A-10C. FIGS. 10A-10C are transverse cross section schematic diagrams of the rod-shaped element (circular rod-shaped element), which show the process from the step 1 of production to the step of cutting or melting bonding. It can be understood that when the rod-shaped element is in any other shape, for example, the cross section is rectangular, square, rhombic, oval, irregular circular or in other shapes, the shapes of the upper and lower mold cavities including the defined wall need to be changed. The "wrapping" of the upper and lower mold cavities can be in a substantially and completely closed covering form, or it can also be that after covering, the wall of the cavity body and the surface of the rod-shaped element have small space, such as a distance from 0.1 mm to 0.3 mm, it will be explained below. When a first porous adsorbing film 30 is placed between the upper cavity body and the rod-shaped element, and when the upper mold and the lower mold are combined, it is expected that the porous adsorbing film can tightly cover the outer surface of the rod-shaped element through the cooperation of the mold cavities and the rod-shaped element, as shown in FIG. 10B, thus the outer surface of the rod-shaped element is covered with one or more layers of porous adsorbing films.

In view of above, the porous adsorbing film is generally flexible, or has certain elasticity or has certain tensile resistance, so that the film can tightly cover the surface of the rod-shaped element through the cooperation of the mold cavities of the molds and the rod-shaped element. Similarly, a second porous adsorbing film 31 can be arranged in the lower mold cavity, and the second porous film has the same specification, size and material as the first porous film, and also has flexibility, or certain elasticity or certain tensile resistance, therefore, when the upper and lower mold cavities are combined, the rod-shaped element is accommodated in the formed mold cavity, the upper film and the lower film are also in the formed mold cavity, and the two films change the shape together through the mold cavity so as to encircle the outer surface (FIG. 10B) of the rod-shaped element.

Figure 11A:
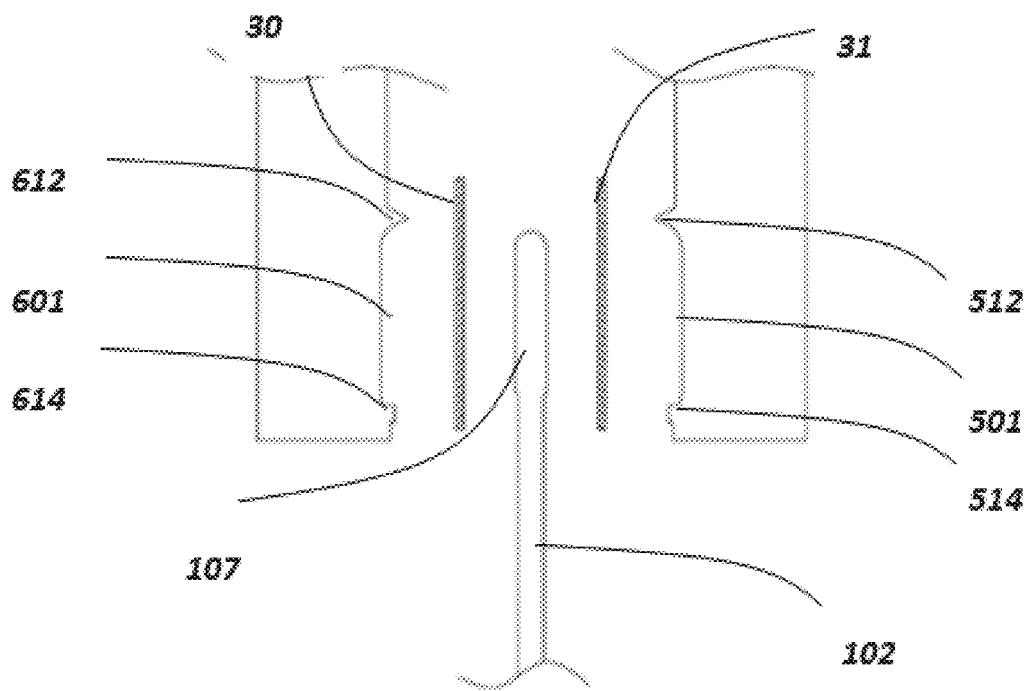
FIG. 11A is a schematic diagram of a cross-sectional structure of an upper mold and a lower mold in a manufacturing process (step 1).
Figure 11B:
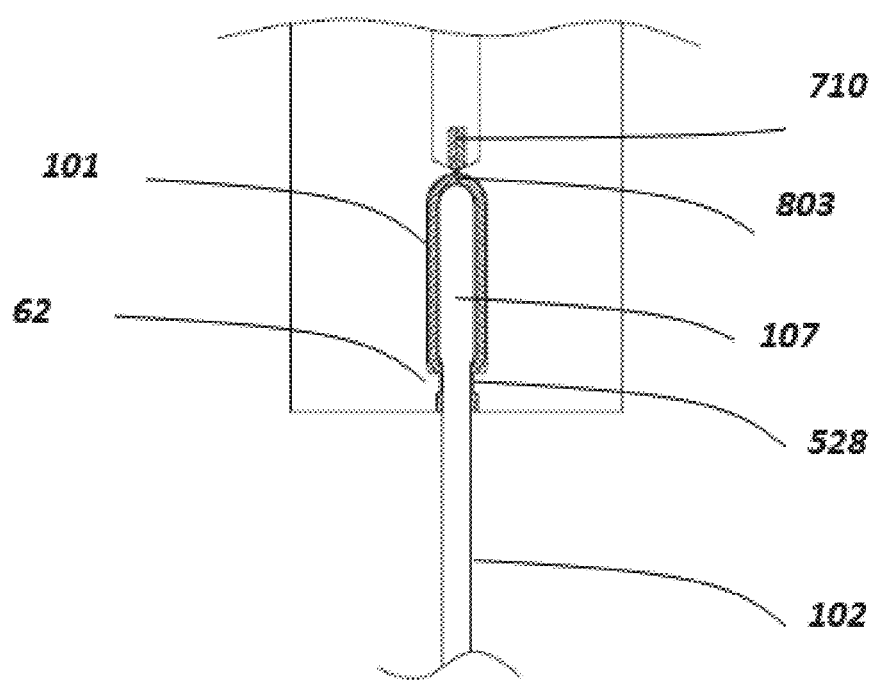
FIG. 11B is a schematic diagram of a cross-sectional structure of an upper mold and a lower mold in a manufacturing process (step 2).
Figure 11C:
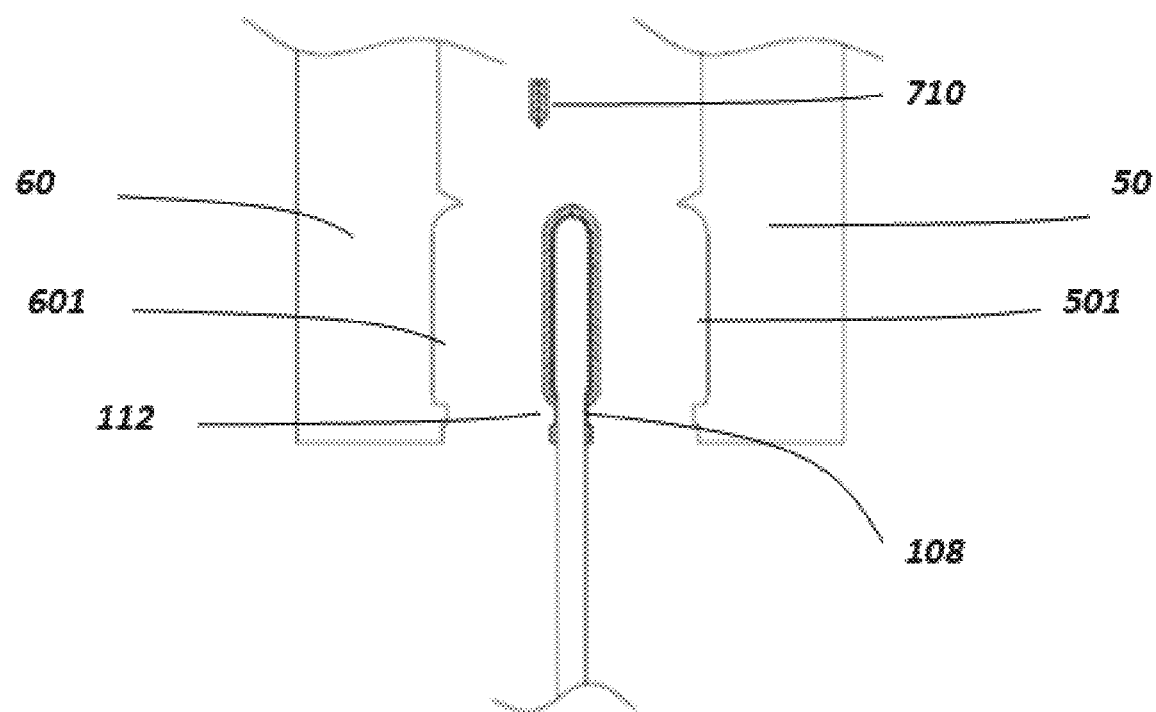
FIG. 11C is a schematic diagram of a cross-sectional structure of an upper mold and a lower mold in a manufacturing process (step 3).

In some embodiments, a mold cavity opening 523 is formed in the edge of a mold cavity wall 906 of the mold cavity 501; when the cross section of the mold cavity is semicircular, the mold cavity wall is provided with edges 502 and 503 of two opposite walls, and the edges are in a sharp cutter edge form or have a certain thickness, for example, the transverse thickness is 0.1-2 mm; and similarly, the mold cavity wall of the upper mold cavity 601 is also provided with edges 604 and 605 of two opposite walls. As shown in FIGS. 11A-11C, the edges are the edges of the whole mold cavity wall and are designed like sharp cutter edges so that the porous film covering the surface of rod-shaped element in the mold cavity can be cut off or melted and bonded by the edges. Certainly, when the glue coats, only cutting is needed, and heating melting is avoided; and when the glue does not coat, melting and bonding are performed. For some porous films, the melting temperature is very high, so the porous films do not need to be melted, the glue coats the surface of the rod-shaped element, when the porous films are processed according to the modes shown in the FIGS. 10A-10B and 11A-11C, the cutting function of the edges of the walls of the mold cavities is needed. Due to the coating of the glue, the porous films can be prevented from falling off through such processing process. Similarly, when the glue is not needed to coat the surface of the rod-shaped element in advance, such as the outer surface of 107, in order to prevent the glue from falling off the surface of the rod-shaped element, two films are bonded together when covering. In case of requiring bonding, the simplest method is to raise the temperature of the edges of the walls of the mold cavities to the melting temperature for melting the porous films, once the films are heated and melted, the melted liquid substances have the similar function of the glue, and the two porous films are bonded together at the contact place of the edges of the mold cavities, such as porous rubber and porous sponge like foaming sponge. It can be understood as that the first porous film 30 and the second porous film 31 can be made of the same or different materials. In case of requiring melting and bonding, it just needs to easily heat and melt one film to bond the two different materials.

When the upper and lower mold cavities are combined, an upper mold cavity edge 502 of the upper mold 50 and a mold cavity edge 605 of the lower mold cavity 601 are in contact or combined, and the first porous film and the second porous film are extruded or pressed together from the peripheries through the cooperation of the edges of the mold cavities (the right in the FIG. 10B). Also, an upper mold cavity edge 503 of the upper mold 501 and a mold cavity edge 604 of the lower mold cavity 601 are in contact or combined, and the first porous film and the second porous film are extruded or pressed together from the peripheries (the left in the FIG. 10B), therefore, the first porous film 30 and the second porous film 31 are sewed or bonded together on the opposite left side and the right side of the rod-shaped element. As shown in the FIG. 10B, when the first film 30 and the second film 31 are not cut or melted and bonded through the mold cavity edge, the first film 30 and the second film 31 wrap the end part 107 of the rod-shaped element, but the films 706 and 705 (the left) with the redundant parts, the film (1081 and 1082) covering the rod-shaped element and the part of 703 at the right side are divided through edge contact of the upper mold cavity and the lower mold cavity, or can be cut under mold pressure or divided while being bonded in a hot melting mode.

In some embodiments, if the surface of the rod-shaped element is coated with a bonder, such as water-based or oil-based glue, two edges, namely, the edges 502 and 503, are in contact to achieve the function of a cutter. The first film and the second film are correspondingly extruded through the opposite upper edges 502 and 503 and lower edges 605 and 604; the edges are in a cutter edge form or have the function of cutting, and the film can be cut from the extruded part or the cutter edge, and the redundant waste materials, namely, the waste materials 705 and 706 of the first film and the second film, can be combined to be taken as one waste material 72; 703 is also the waste materials left by the first film and the second film and is integrally taken as a waste material 73. The left and right waste materials can be directly discarded. Therefore, cutting lines are left on the left and right sides of the absorbing head, namely joint lines are formed at the left and right joints, on the surface of the rod-shaped element, of the upper porous film and the lower porous film, and the joint lines can be called as the bonding lines and can also be called as the combination lines. Therefore, the absorbing head has lines 104 and 109 (FIG. 2B) at the left and right.

Similarly, as shown in FIGS. 11A and 11B, when the top end 1091 of the rod-shaped element is wrapped by the first porous film and the second porous film, the mold cavity wall edge 512 at the top end of the mold cavity and the mold cavity wall edge 512 at the top end of the lower mold cavity can also make contact with each other to extrude the first porous film and the second porous film to cover the area of the top end 1091 of the rod-shaped element. If the top end is coated with the bonder such as glue, an extrusion line 803 is formed when the edges extrude each other, cutting is completed through the pressure of the edges, and the cut waste material 710 is discarded. Therefore, a cutting line 803 is also left at the top end of the absorbing head, and a joint line 105 (FIG. 3A and FIG. 2B) is left at the joint of the two porous films at the top end.

Figure 12:
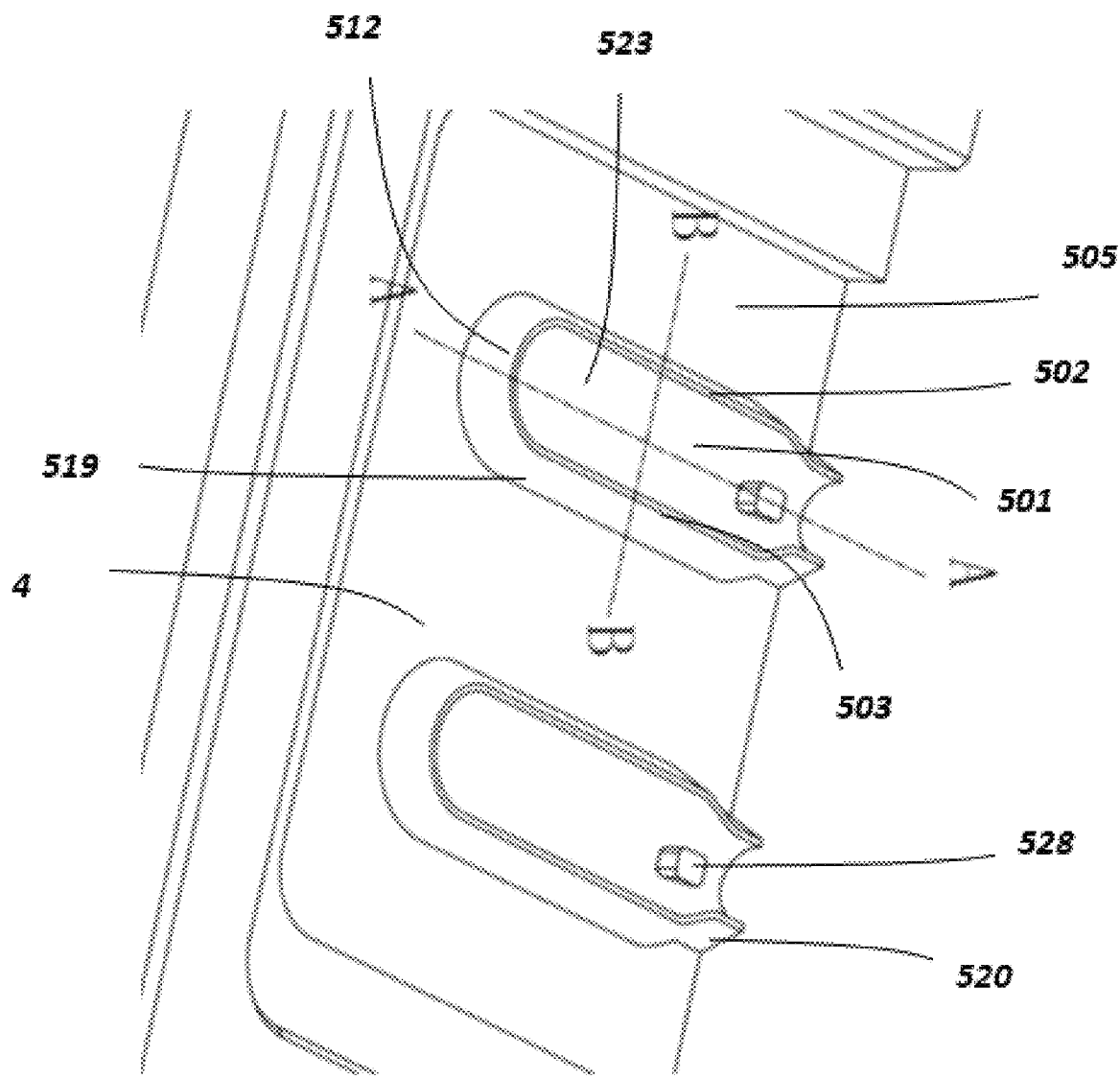
FIG. 12 is an enlarged schematic diagram of a mold for manufacturing of one specific embodiment of the present invention (upper mold).
Figure 14:
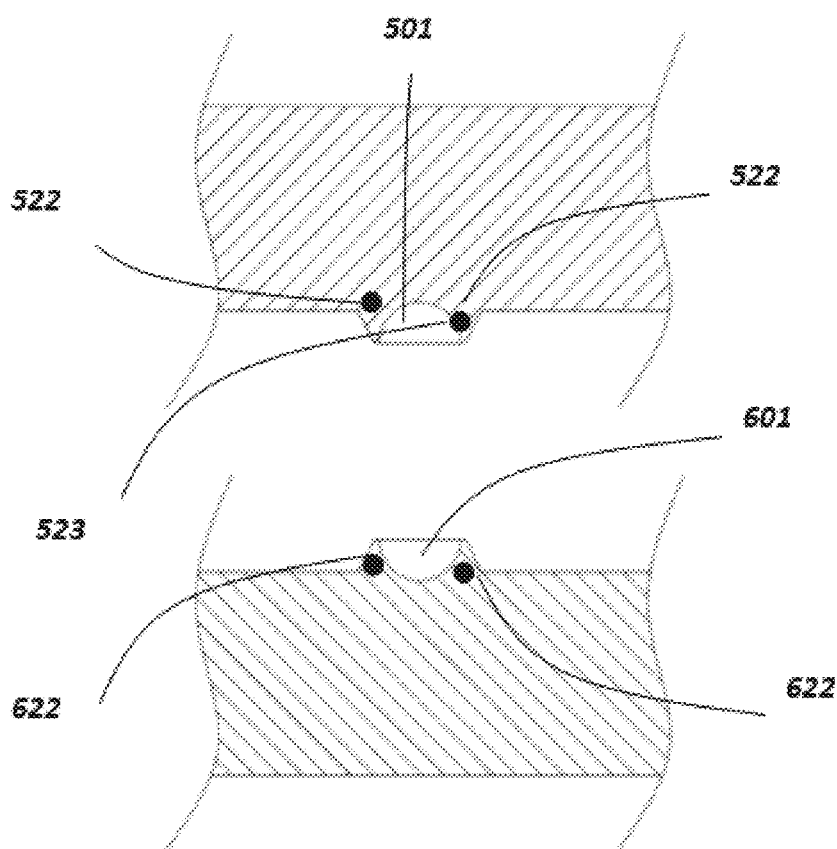
FIG. 14 is a schematic diagram of a cross-sectional structure of B-B' of an upper mold and a corresponding lower mold.
Figure 15:
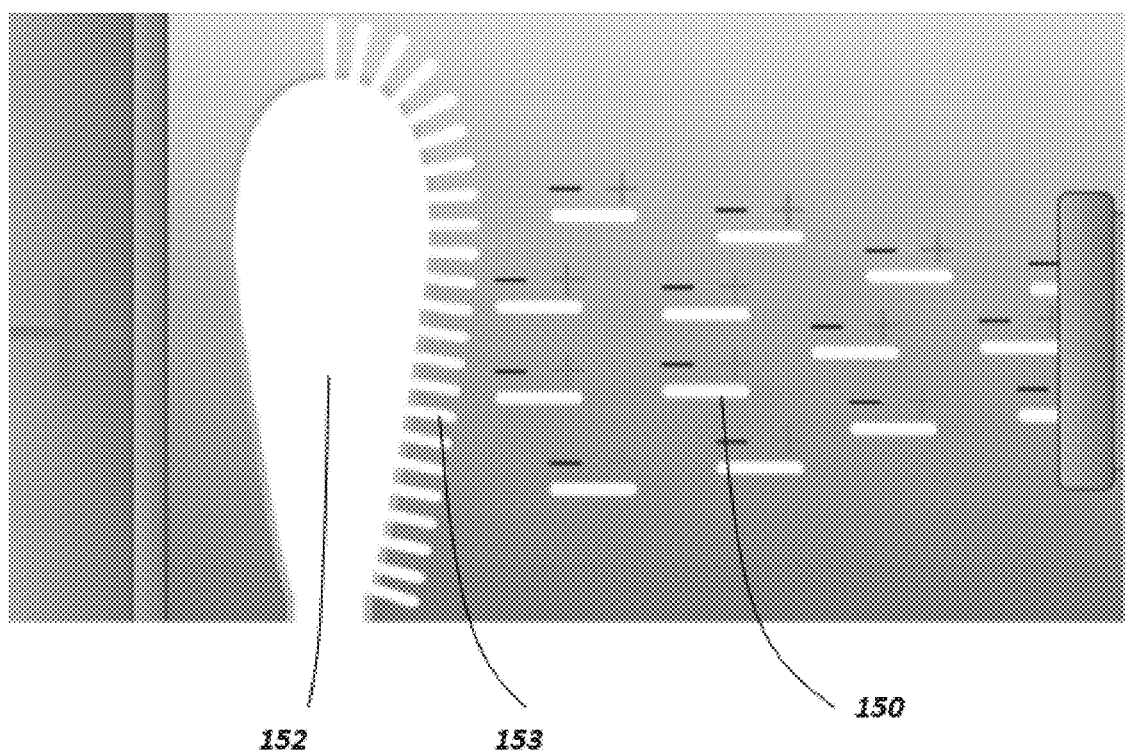
FIG. 15 is a schematic diagram of preparation and bonding of a single fiber by conventional electrostatic adsorption.

The "line" described herein can be treated as the boundary or the bonding line. The boundary means that two porous films have a joint when covering an outer surface 107 and a head 1091 of the whole rod-shaped element. After the upper and lower mold cavities of the mold are sized, redundant waste materials are cut, a line-like object is formed at the joint of the boundaries. The line can longitudinally surround the positions of the absorbing heads (as shown in FIG. 2B) 104, 105 and 109, and is a continuous line. Certainly, the occurrence of the line depends on different processing modes. If there is only one mold, and the mold has only one mold cavity, the whole rod-shaped element can be accommodated in the mold cavity, the rod-shaped element transversely enters the mold cavity to drive the porous films to enter the mold cavity together, then the cutting is performed by closing the edges of the wall of the mold cavity, a cutting line may appear on one side of the absorbing head, namely, one side may have the boundary, and the other side may not have, such processing mode is relatively complex. The bonding line means that when the first film and the second film are extruded together by the edges of the upper and lower mold cavities (the trace of the extruded line), the first film and the second film are bonded together by heating due to the heating and melting of the edges of the walls of the mold cavity, so that the form of the line is also formed, and at the time, the surface of the rod-shaped element can be coated with glue, or the glue is not used. As shown in FIGS. 13 and 14 and combined with FIG. 12, the upper mold and the lower mold are metal molds, metal is heated in an external heating mode, or heating pipes 522 and 521 are embedded in the whole edges 503 and 502 of the mold cavity (e.g., the heating pipes are embedded in the position of 514, as shown in FIG. 13). When the upper and lower mold cavities are closed, the edge of the wall of the whole upper mold cavity and the edge of the wall of the whole lower mold cavity are heated, and the temperature is controlled within a certain range or kept constant. When the edge of the upper mold and the edge of the lower mold extrude the first porous film and the second porous film, and the melting points of the films are melted at this temperature, for example, the porous sponges are adopted, the temperature is 150-180° C., the sponges at the extrusion positions 701, 7001 and 803 are melted due to extrusion and high temperature, the melted sponges are bonded together, and the upper porous film and the lower porous film are bonded together through the function of cutting other waste materials while extrusion or melting is conducted. As shown in FIG. 12, the mold cavity wall is of hollow structures 512 and 519, and the heating pipes are laid in the middle in advance to directionally heat the wall, especially the edges. As shown in cross sections A-A and B-B, a hollow space 514 is formed below the edges 502 and is used for laying the heating pipes through which the edge or the mold cavity wall has a certain high temperature, thus two porous films which are easily heated and melted by contact can be melted to be bonded together. Similarly, the lower mold cavity 601 also has a wall and edges 604 and 605 corresponding to those of the upper mold cavity, the wall is also of a hollow structure, as shown in FIGS. 13 and 14, there is also a space for laying the heating pipes 622 through which the edges or the mold cavity wall can reach certain high temperature.

In some embodiments, the edges of the walls of the mold cavities also have respective extending edges 504 and 505 which are the connecting surfaces between the two mold cavities. As shown in FIG. 12, when a plurality of rod-shaped elements are processed at one time, two spacing surfaces 503 and 504 play a role in compressing redundant porous films as well as laying the heating pipes, thus each mold cavity or the edge of the wall of each mold cavity is kept at a certain high temperature, and the film can be conveniently and only accurately compressed and melted. As shown in FIGS. 10A and 11A and in combination with FIG. 12, the extending edges are actually extending surfaces, the mold cavities are arranged in an A-A' form in the length direction, and these surfaces can be the joints of a plurality of same mold cavities. It can be understood as that two pieces of porous sponges are melted at a high temperature and then are bonded together, and after extruded points or extruded surfaces are melted, compared with those without being extruded and melted, there is a trace which looks like a line.

In some embodiments, when there is no need to coat the surface of the rod-shaped element with glue, even if the first porous film and the second porous film are fused together in a heating mode, there might be the risk that the first porous film and the second porous film fall off from the surface of the rod-shaped element. In order to better fix the porous water-absorbing films to the rod-shaped element, the device further comprises the fixing structure, and the fixing structure enables the films to be extruded or melted so as to be bonded with the rod-shaped element. In some embodiments, bulge 528 is arranged in the mold cavity 501, and the bulge can extrude the porous films to bond to the surface of the rod-shaped element. In order to avoid glue as much as possible, when the upper and lower mold cavities are closed in the machining process, the opposite bulges 528 and 628 synchronously extrude the porous films covering the surface of the rod-shaped element. If the melting point of the porous film is very low, for example, the temperature of the melting point is 150-250° C., the melting temperature of the sponge is 180° C., the bulges 528 and 628 are heated by heating pipes 521 and 621 embedded in the mold cavity, thus the porous film in contact with the bulges can be melted, and the melted fluid is in contact with the surface of the rod-shaped element to realize bonding, and as a result, the porous film is fixed on the rod-shaped element, the risk of falling off is reduced, the step of using additional glue for coating is avoided, and the harm of the glue to the human body or the adverse effect of the glue on the detection result in the using process is also reduced. There is a processing trace in the collector, for example, as shown in FIG. 2A, FIG. 2B, FIG. 3A and FIG. 3B, there are sunken places 108 and 112 in the head of the collector, which are concave ports for extruding and bonding in the processing process. The bonding point capable of being heated and melted can also be called as a melting point, and therefore, the surface of the head 107 of the whole rod-shaped element does not need to be coated with the glue. In some embodiments, as shown in FIG. 12 and combined with FIGS. 11-13, the mold cavity 501 is not in a regular semi-cylindrical shape, but is in a form of contracting at the side opening, for example, the diameter of the mold cavity is reduced relative to the distant end of the mold cavity or the top end 1091 of the absorbing head at a position near the bulge 528 (the upper mold 50) and a lower mold bulge 628 and the tail end far away from the absorbing head 1091, such design aims at enabling the porous film to be subjected to a slight compression process in a corresponding area on the surface of the rod-shaped element in the processing process, and as shown in a specific absorbing head (FIG. 2B), there is a relatively contracted area 111. In production, although porous water-absorbing films with the same thickness are adopted in this area, there are also some relatively compressed areas, the diameter sizes of the rod-shaped elements in the mold cavities are uniform and consistent, thus the porous film on the main absorbing head 112 can be prevented from falling off from the surface of the rod-shaped element to the greatest extent. Extrusion blocks 513 and 630 are matched for extrusion on the mold, the porous films are elastic, if the temperature is increased near a pressing block, the porous films cannot be melted at this temperature, but the porous films have the shrinkage property after being heated, such as some plastics, porous plastic films and porous sponge films, and the films can more tightly cover the surfaces of the rod-shaped elements due to the shrinkage. But the condition is that the whole rod-shaped element is not coated with glue. As mentioned above, a bump extrudes, or the bump heats to melt the porous film to enable the porous film to be bonded on the surface of the rod-shaped element, in addition, the contracted area 111 is provided, so that the porous films covering the heads 107 of the rod-shaped elements can be prevented from falling off.

Figure 4:
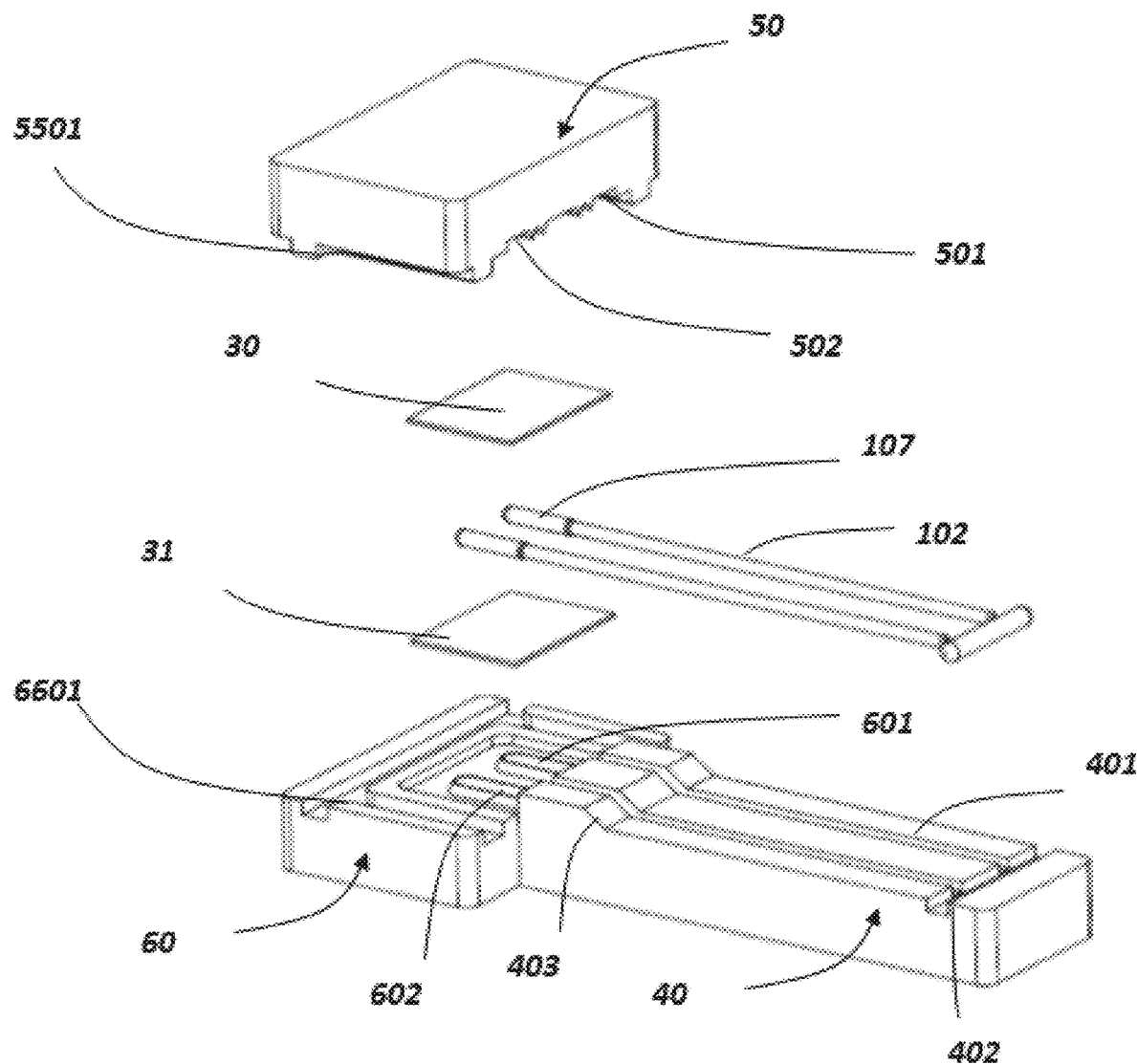
FIG. 4 is a 3D structure schematic diagram and a manufacturing coordination diagram of a device for manufacturing a sample collector in one specific embodiment of the present invention.
Figure 5:
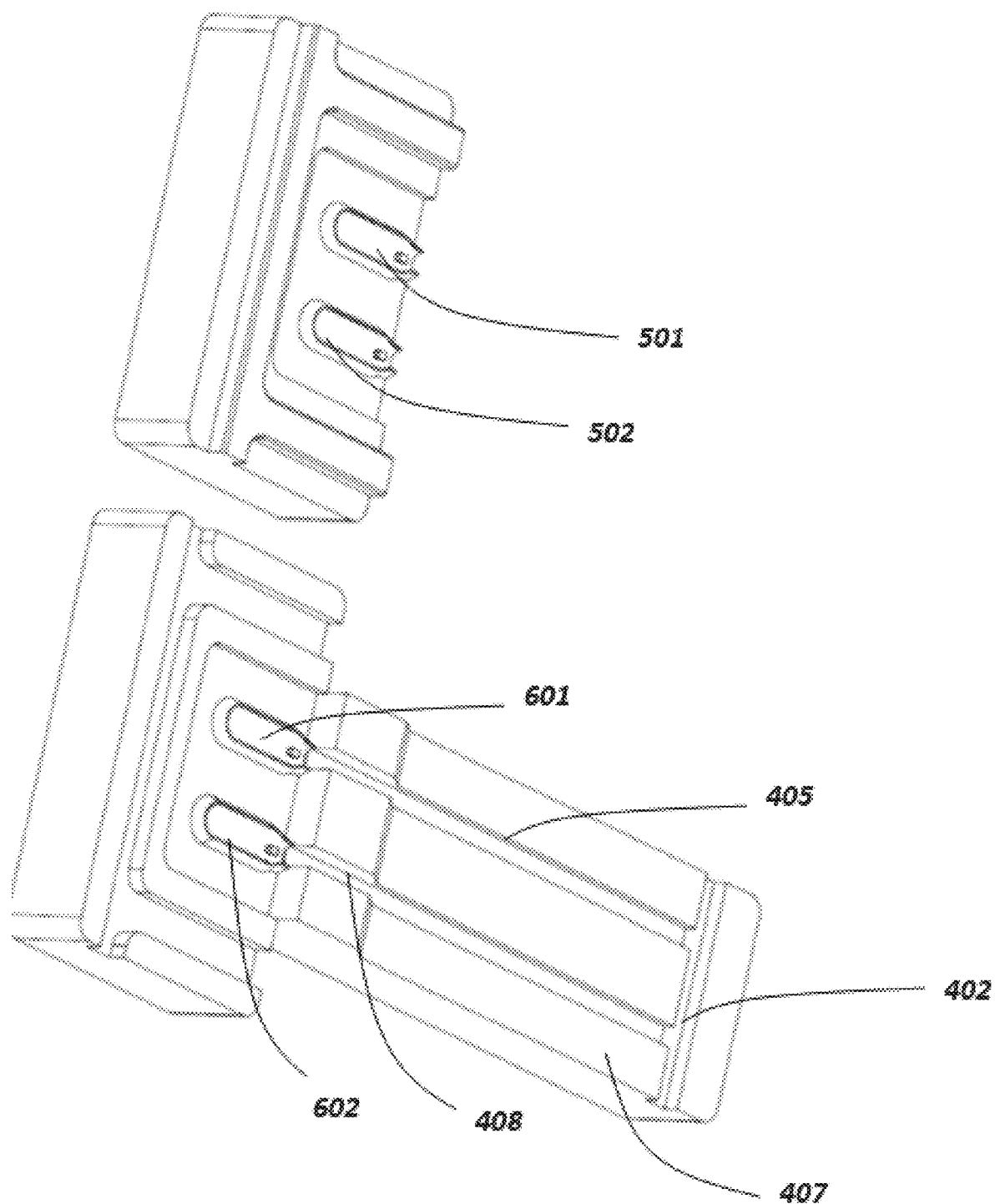
FIG. 5 is a specific structure schematic diagram of an upper mold and a lower mold for manufacturing a device.
Figure 6:
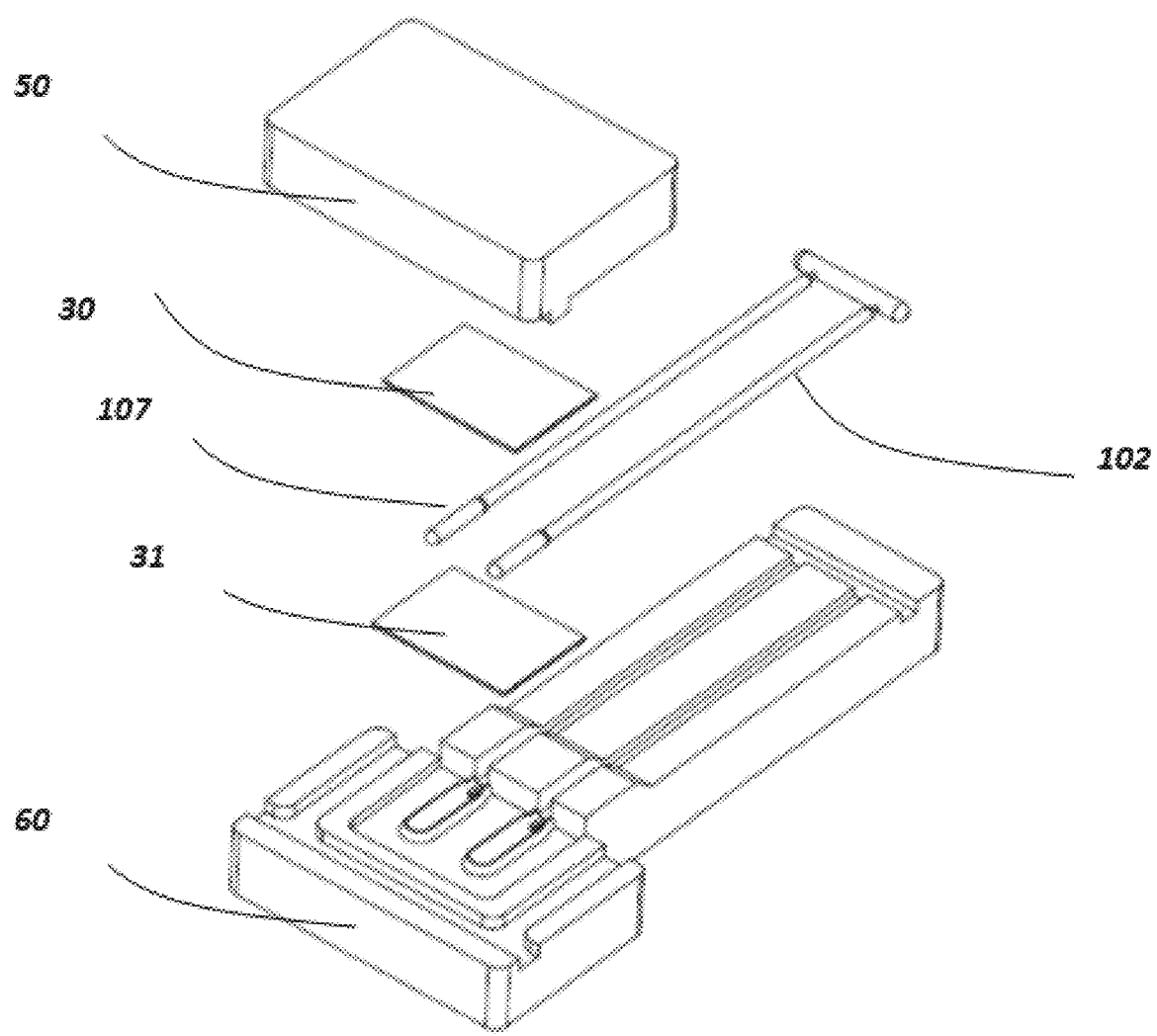
FIG. 6 is a 3D structure schematic diagram of a device for manufacturing a sample collector and step 1 of a manufacturing process in one specific embodiment of the present invention.
Figure 7:
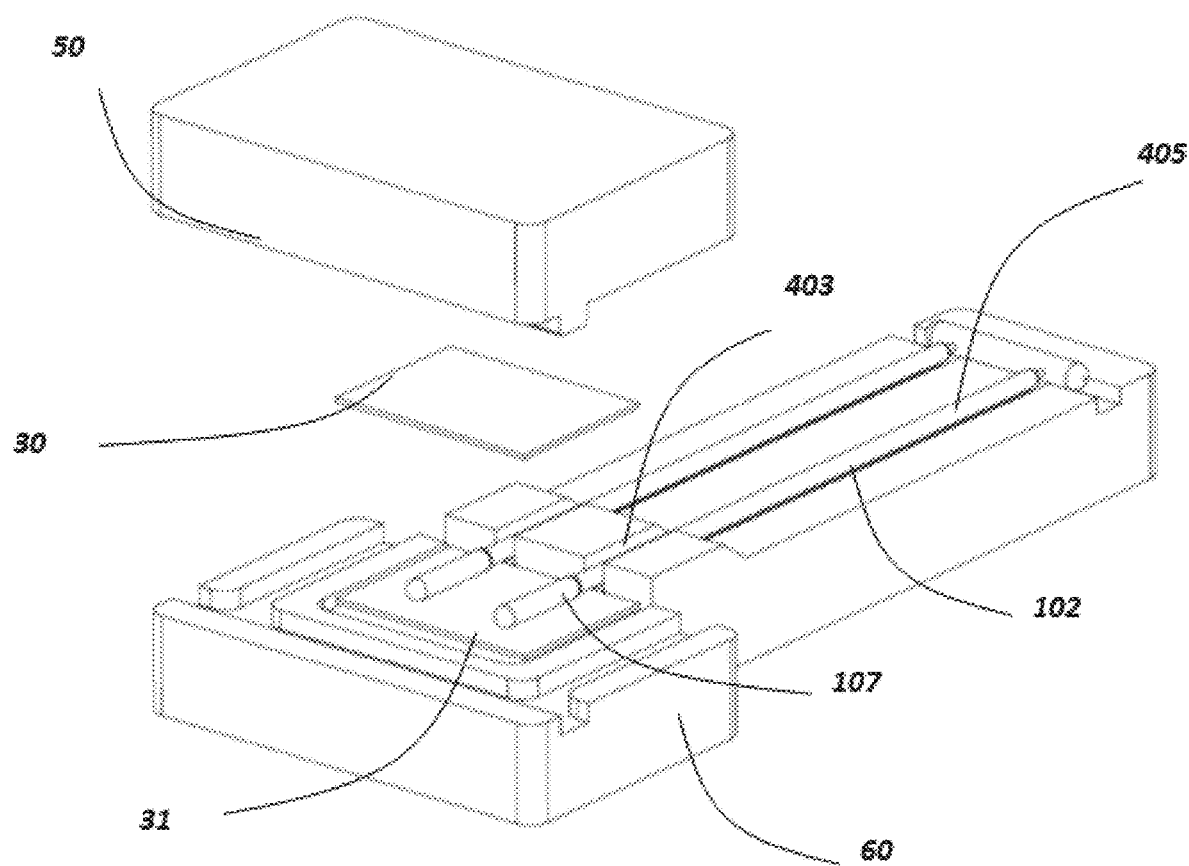
FIG. 7 is a 3D structure schematic diagram of a device for manufacturing a sample collector and step 2 of a manufacturing process in one embodiment of the present invention.
Figure 8:
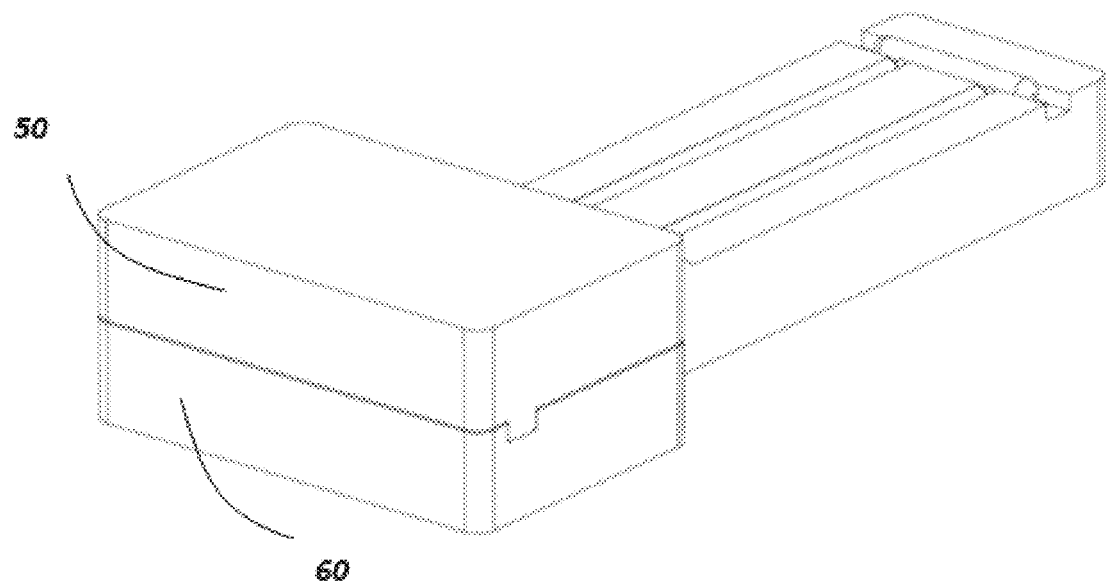
FIG. 8 is a 3D structure schematic diagram of a device for manufacturing a sample collector and step 3 of a manufacturing process in one embodiment of the present invention.
Figure 9:
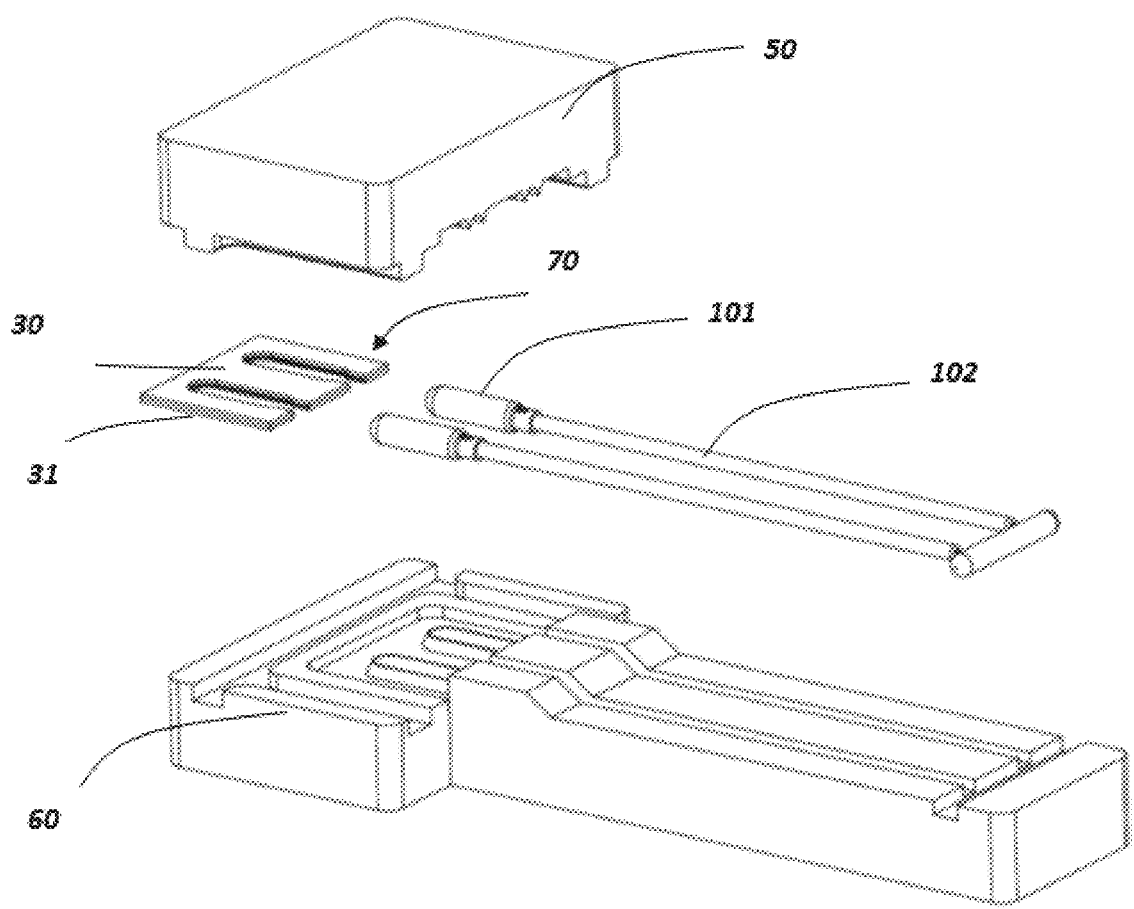
FIG. 9 is a 3D structure schematic diagram of a device for manufacturing a sample collector and step 4 of a manufacturing process in one embodiment of the present invention.

Described above is the device that can be used for manufacturing a single absorber or performing sampling. In case of processing a plurality of absorbers at one time, a plurality of mold cavities are repeatedly formed in a mold and are arranged at intervals, thus a plurality of collectors can be processed at one time by the mold with the plurality of mold cavities. FIGS. 4-9 show the flow and process diagram of processing two collectors. As shown in FIG. 4, the device is provided with the upper mold 50 and the lower mold 60, wherein the upper mold is provided with two mold cavities 501 and 502, and each mold cavity is provided with a mold cavity wall; the wall of each mold cavity is provided with an edge 502 (FIG. 13), and the edge is similar to a cutter edge and has a certain thickness, such as 0.1-1 mm; and the porous film can be extruded or can be melted by heating through the edge. When the two dies are closed, the two mold cavities are spaced from each other; heating wires are embedded into the mold cavity walls and are used for heating the walls of the mold cavities, particularly the edges; and if the molds are metal molds, the molds have excellent heat conductivity. The lower mold 60 is correspondingly provided with two mold cavities 601 and 602; in order to accurately position the upper and lower mold cavities and extrude and align the edges of the mold cavities without causing dislocation, positioning grooves are formed in the molds, for example, a convex groove 5501 is formed in the upper mold, a concave groove 6601 is formed in the lower mold, and when the upper and lower dies are matched, the upper and lower molds are positioned more accurately by adopting the cooperation of the convex groove and the concave groove. A plurality of similar designs or structures can be added, thus the positioning is more accurate. In some embodiments, in order to facilitate processing, a part of rod-shaped element covered with the porous film is generally arranged in the mold cavity, and the rod-shaped element without being covered with the porous film can be fixed by positioning. For example, as shown in FIG. 4, a positioning structure 40 is provided, a plurality of positioning grooves are formed in the positioning structure, and the rod-shaped elements can be placed in the positioning grooves 408, so that the rod-shaped elements are prevented from moving in the processing process. Therefore, each positioning groove is provided with a plurality of sections, namely a first positioning groove section 403, a second positioning groove section 405 and a third positioning groove section 402, wherein the first and second positioning groove sections are longitudinally arranged, the third positioning groove section is transversely arranged, and the first positioning groove section is deeper than the second positioning groove section. As shown in FIG. 5, it is designed for safety, when the rod-shaped element 20 is manually placed in each positioning groove, the positioning grooves close to the mold cavity is deeper, and the hands of an operator are not easy to touch or extend into the position between the mold cavities, so that the probability of injury to the operator is reduced. Generally, the first porous film 31 is laid on the surface of the lower mold cavity 60 during operation, then a rod-shaped element combination or a plurality of rod-shaped element combinations are placed in the positioning grooves (FIG. 7), connecting rods 203 for connecting a plurality of rod-shaped elements are placed in the transverse positioning grooves 402, the longitudinal rod-shaped elements 204 are placed in the longitudinal positioning grooves, the end parts 107 of the rod-shaped elements 201 to be wrapped by the porous films are placed in the mold cavities. Although the first porous film covers the lower mold cavity, the positioning of the positioning grooves enables the rod-shaped elements to be accurately positioned in the middle position of the mold cavity (FIG. 7), then the second porous film 30 is placed on the rod-shaped elements, the upper mold and the lower mold are combined and pressurized to complete mold pressing (FIG. 8). After the mold pressing is completed, the upper mold and the lower mold are separated, and cut-off waste materials 70 are removed, so that the porous film covers the surfaces of the rod-shaped elements to form the collectors shown in FIGS. 1-3. After wrapping is completed, the waste materials are removed, then the wrapped collectors are taken out of the mold cavity, and finally, the wrapped collectors are disassembled one by one and are separately sub-packaged. Along with the matching of the upper and lower molds, more than two collectors such as 3, 5, 8, 10, 20, 30 and 40 can be produced at one time.

When a similar mold is used for producing and manufacturing the collector as shown in FIG. 1B, a thinner rod-shaped element is provided, the bump 528 is relatively higher and is higher from the bottom surface of the mold cavity, the positioning is performed through the positioning groove, but the end part of the rod-shaped element does not completely fill the mold cavity. For the example, if the longitudinal length of mold cavity is the length of A-A as shown in FIG. 12, but the end part of the rod-shaped element is only half, three fourths and three fifths of the longitudinal mold cavity 501, other processing modes are not changed, a part of porous film 12 extends from the end part, and due to the absence of the rod-shaped element, this part of porous film can be melted by adopting the edge of the top end of the mold cavity, so that two films can be bonded together. Similarly, in case of covering the periphery of the rod-shaped element with the extending porous film, the transverse diameter of the end part of the rod can be smaller than the width of B-B in the direction of the mold cavity, for example, the transverse diameter is half, three fourths and three fifths of the width of the mold cavity 501, and the bonding is performed in the same way, thus the end part of the thinner rod-shaped element is provided with a loose porous film (FIG. 2C) sleeve for absorbing the fluid specimen.

The following examples are also part of the present invention.

1. A device for collecting a specimen for clinical diagnosis analysis, comprising an end part wrapped with one or more layers of water-absorbing films.

2. The device according to clause 1, wherein the device comprises a rod-shaped element, and the end part is a part of the rod-shaped element; and the end part wrapped with the one or more layers of water-absorbing films covers the rod-shaped element, thus the end part has water absorption.

3. The device according to clause 1, wherein the one or more layers of water-absorbing films comprise a first layer water-absorbing film and a second layer of water-absorbing film; and the first layer of water-absorbing film and the second layer of water-absorbing film are bonded to a surface of the end part of the rod-shaped element so as to form a wrapped end part.

4. The device according to clause 3, wherein a combination line formed by a first porous film and a second porous film is arranged on the surface of the end part of the rod-shaped element.

5. The device according to clause 3, wherein the materials of the first film and the second film are bonded in a hot pressing mode.

6. The device according to clause 3, wherein the first layer of water-absorbing film and the second layer of water-absorbing film are made of a same material.

7. The device according to clause 3, wherein one or both of a first porous water-absorbing film and a second porous water-absorbing film have the property of melting by heating or can be melted by heating to gain the property of bonding.

8. The device according to clause 3, wherein the heating temperature is 100-250° C., or 120-200° C. or 160-180° C.

9. The device according to claim 3, wherein the materials of the first film and the second film are selected from artificial fibers, and natural materials selected from cotton and silk, or a cotton and silk mixed material, or a sponge material, or a sponge and cotton mixed material, or a sponge and cotton thread mixed material.

10. The device according to clause 9, wherein the sponge is a porous water-absorbing sponge or a foaming sponge.

11. The device according to clause 9, wherein a water-absorbing end part comprises a bonding line formed by bonding the porous films together through heating and melting.

12. The device according to clause 11, wherein the bonding line is located at the water-absorbing end part, or the bonding line is located on two sides and/or a top part of the water-absorbing end part.

13. The device according to clause 11, wherein the thickness of the materials of the porous water-absorbing films is 0.01 mm or above.

14. The device according to clause 13, wherein the water-absorbing material is a sponge material.

15. The device according to clause 13, wherein the thickness is 0.05 mm or above, or 0.1 mm or above, or 0.2 mm or above, or ranges from 0.1 mm to 5 mm.

16. The device according to clause 1, wherein the water-absorbing end part is capable of absorbing 0.1-1 ml of liquid or 0.1-800 microliters of liquid, or 1-200 microliters of liquid or 20-200 microliters of liquid.

17. The device according to clause 1, wherein in some embodiments, the water-absorbing end part is provided with a top area and an area away from the top or an area opposite to the top; and the area away from the top comprises a concave area, and the concave area is melted to form an area bonded with the rod-shaped object.

18. The device according to clause 17, wherein the concave areas are distributed on the two sides of the water-absorbing end part.

19. The device according to clause 17, wherein the concave bonding area and the bonding line are located on a same side of the end part.

20. The device according to clause 17, wherein the area, far away from the top, of the water-absorbing end part is a contraction area, and the diameter of the contraction area is smaller than that of the top area.

21. A toolbox for collecting and transporting a biological sample, comprising a test tube with treating liquid and the device for collecting a liquid specimen according to one of clause 1 to 20.

22. A method for preparing a device for collecting a specimen, comprising the following steps: providing a rod without a hydrophilic fiber material, a first porous water-absorbing film and a second porous water-absorbing film, and enabling an end part of the rod to be positioned between the first porous water-absorbing film and the second porous water-absorbing film; and enabling the first film and the second film to wrap the end part of the rod so as to form a water-absorbing end part.

23. The method according to clause 22, wherein glue is applied to the end part of the rod, the end part is wrapped by the first porous water-absorbing film and the second porous water-absorbing film, and the porous films are bonded to an outer surface of the end part through the glue.

24. The method according to clause 22, wherein the length of the first porous water-absorbing film is greater than the perimeter or half of the perimeter of the end part, and the length of the second porous water-absorbing film is greater than the perimeter or half of the perimeter of the end part; and when the end part is wrapped by the first porous film and the second porous film, redundant porous films at a junction of the first porous film and the second porous film are cut off.

25. The method according to clause 22, wherein peripheries of the first film and the second film are bonded together in a hot pressing mode, and/or the redundant porous films are cut off in the hot pressing mode at the same time.

26. The method according to clause 22, wherein the first film and the second film are porous water-absorbing films made of sponge materials.

27. The method according to clause 22, wherein the first film and the second film are made of water-absorbing porous sponges.

28. The method according to clause 22, wherein the water-absorbing porous sponges are foaming sponges.

29. The method according to clause 22, wherein the thickness of the first film and/or the second film is 0.1-5 mm.

30. A device for producing and manufacturing the water-absorbing collecting specimen, comprising a mold, wherein the mold comprises a mold cavity, and the mold cavity is used for receiving a porous water-absorbing film and an end part of a rod-shaped element.

31. The device according to clause 30, wherein the mold cavity comprises a cavity body for accommodating the rod-shaped element and a wall for surrounding the mold cavity, and further comprises an edge positioned on the wall.

32. The device according to clause 31, wherein the mold cavity is provided with a longitudinal opening which is surrounded by the edge on the wall.

33. The device according to clause 32, wherein the device further comprises a heating element which can heat the edge to a rated temperature, and the porous film can be melted at this temperature.

34. The device according to clause 32, wherein the longitudinal opening is used for receiving the end part of the rod-shaped element and the porous water-absorbing film.

35. The device according to clause 32, wherein the mold cavity comprises a bulge, and the bulge is used for extruding the porous film on the end part so that the porous film can be fixed on the surface of the end part of the rod-shaped element.

36. The device according to clause 32, wherein the mold includes an upper mold and a lower mold or a first mold and a second mold; the first mold comprises a first mold cavity, and the second mold comprises a second mold cavity; and by designing the mold cavities in such way, when the first mold cavity and the second mold cavity are closed or combined, the mold cavities substantially wrap the end part of the rod-shaped element.

37. The device according to clause 35, wherein the first mold cavity can accommodate part of the end part of the rod-shaped element, and the second mold cavity can accommodate the rest part of the end part of the rod-shaped element, or the end part of the rod-shaped element comprises a first end part and a second end part, and the first end part and the second end part constitute the whole end part.

38. The device according to clause 36, wherein the first mold cavity can accommodate the first porous film, and the first porous film covers an external surface of the first end part of the rod-shaped element when the first end part of the rod-shaped element is accommodated in the mold cavity.

39. The device according to claim 36, wherein the second mold cavity can accommodate the second porous film, and the second porous film covers an external surface of the second end part of the rod-shaped element when the second end part of the rod-shaped element is accommodated in the mold cavity.

40. The device according to clause 30, wherein the first mold cavity and the second mold cavity are respectively provided with a bulge extrusion element, and when the first mold cavity and the second mold cavity are closed or combined, the bulge extrusion elements can relatively extrude the porous water-absorbing film covering the outer surface of the end part of the rod-shaped element.

41. The device according to clause 40, wherein the bulge extrusion elements can be endowed with temperature, and the porous water-absorbing film can be melted at this temperature, thus the film is bonded to the rod-shaped element.

42. The device according to clause 41, wherein the bulge is arranged near side opening of the mold cavity; and in some embodiments, the diameter of the side opening is smaller than that of the top area of the end part of the rod-shaped element.

43. The device according to clause 31, wherein a plurality of mold cavities are distributed on the mold at intervals, and the edges of the mold cavities are higher than the interval areas among the mold cavities.

44. The device according to clause 31, wherein the edges have the function of cutting the porous film.

45. The device according to clause 31, wherein the edge of the mold cavity of the first mold and the edge of the mold cavity of the second mold can cut off a joint of the first porous film and the second porous film while extruding the two films.

46. The device according to clause 31, wherein the edges have a certain temperature by which the first porous film or the second porous film can be melted at the areas making contact with the edges, therefore, the first film and the second film are bonded.

47. The device according to clause 46, wherein the width of the areas making contact with the edges of the walls is 0.1-2 mm.

48. A method for producing a water-absorbing collector, comprising
    providing a first mold and a second mold, wherein the first mold comprises a first mold cavity, and the second mold comprises a second mold cavity;
    covering the second mold cavity with a first porous film, enabling the end part of a rod-shaped element to be positioned above the first porous film, and enabling a second porous film to be positioned between the first mold cavity and the end part of the rod-shaped element; and
    closing or combining the first mold cavity and the second mold cavity, enabling the rod-shaped element to be positioned in a space defined by the first mold cavity and the second mold cavity, and enabling the first porous film and the second porous film to cover the outer surface of the rod-shaped element.

49. The method according to the above claims, wherein the mold cavity comprises a wall that defines the mold cavity and an edge on the wall, and the edge forms an opening of the mold cavity.

50. The method according to clause 49, wherein the first porous film and the second porous film are positioned between the first mold cavity and the second mold cavity; the first porous film is positioned above the second porous film; and the end part of the rod-shaped element is positioned between the first porous film and the second porous film.

51. The method according to clause 50, wherein the first mold cavity and the second mold cavity are combined or closed so that the first porous film and the second porous film cover the outer surface of the rod-shaped element and wrap the whole end part.

52. The method according to clause 51, wherein the edge of the first mold cavity and the edge of the second mold cavity are aligned and pressed against a boundary of the first porous film and the second porous film so that redundant porous films can be cut off by the edges.

53. The method according to clause 52, wherein the first film and the second film are bonded together by melting the areas making contact with the edges.

54. The method according to clause 52, wherein the division is carried out according to the end part of the rod-shaped element; each edge comprises a left edge, a right edge and a top edge; the left and right edges can be used for cutting off or melting and bonding redundant films distributed on the left and right of the top part of the rod-shaped element; and the top edge is used for cutting off or melting and bonding the redundant porous films wrapping the top.

55. The method according to clause 54, wherein the cut-off redundant films or redundant films falling off after melting and bonding are distributed in an interval area between the mold cavities.

All patents and publications mentioned in the specification of the present invention indicate that these are disclosed techniques in the art and can be used in the present invention. All patents and publications cited herein are also incorporated by reference as if each publication was specifically and individually incorporated by reference. The present invention described herein may be practiced in the absence of any element or elements, limitation or limitations, no such limitation specifically stated herein. For example, the terms "containing", "substantially comprising" and "comprising" in each example herein may be replaced by either of the remaining two terms. Here, the so-called "one" here only means "one" numerically, and it does not exclude that only one is included, and it may also mean that two or more are included. The terms and expressions used herein are by way of description and are not limited thereto, and it is not intended here to indicate that these terms and interpretations described in this specification exclude any equivalent features, but it is understood that any suitable changes or modifications may be made within the scope of the invention and claims. It can be understood that the examples described in the present invention are all preferred examples and features, and any person of ordinary skill in the art can make some modifications and changes according to the essence of the description of the present invention, and these modifications and changes are also considered to fall within the scope of the present invention and the scope defined by the independent claims and the dependent claims.

The invention claimed is:

1. A device for collecting a specimen, comprising an end part that is wrapped with a first layer of porous water-absorbing film and a second layer of porous water-absorbing film to form a wrapped end part;
wherein the first layer of porous water-absorbing film and the second layer of porous water-absorbing film are bonded together in a hot pressing mode, and the first layer of porous water-absorbing film and the second layer of porous water-absorbing film are made of porous sponge.

2. The device according to claim 1, wherein the device comprises a rod-shaped element and the end part is a part of the rod-shaped element; and wherein the end part is covered with the first layer of porous water-absorbing film and the second layer of porous water-absorbing film, thus the end part has water absorption.

3. The device according to claim 1, wherein a combination line, formed by the first layer porous water-absorbing film and the second layer of porous water-absorbing film, is formed by the bonding between the first layer porous water-absorbing film and the second layer of porous water-absorbing film.

4. The device according to claim 1, wherein the first layer of porous water-absorbing film and the second layer of porous water-absorbing film are made of a same material.

5. The device according to claim 1, wherein one or both of the first layer of porous water-absorbing film and the second layer of porous water-absorbing film have a property of melting under a heating temperature or are melted by a heating temperature to gain a property of bonding.

6. The device according to claim 5, wherein the heating temperature is 100-250° C., or 120-200° C. or 160-180° C.

7. The device according to claim 1, wherein the sponge is a porous water-absorbing sponge or a foaming sponge.

8. The device according to claim 1, wherein the wrapped end part comprises a bonding line formed by bonding the first and second porous films together through heating and melting.

9. The device according to claim 8, wherein the bonding line is located at the wrapped end part, or the bonding line is located on two sides and/or a top part of the wrapped end part.

10. The device according to claim 8, wherein a thickness of the materials of the porous water-absorbing films is 0.01 mm or above.

11. The device according to claim 10, wherein a material of the water-absorbing films is a sponge material.

12. The device according to claim 10, wherein the thickness is 0.05 mm or above, or 0.1 mm or above, or 0.2 mm or above, or ranges from 0.1 mm to 5 mm.

13. The device according to claim 1, wherein the wrapped end part is capable of absorbing 0.1-1 ml of liquid or 0.1-800 microliters of liquid, or 1-200 microliters of liquid or 20-200 microliters of liquid.

14. The device according to claim 1, wherein the wrapped end part is provided with a top area and an area away from the top area or an area opposite to the top area; and the area away from the top area comprise a concave area, and the concave area is melted to form an area bonded with a rod-shaped element.

15. The device according to claim 14, wherein the concave area is distributed on two sides of the wrapped end part.

16. The device according to claim 14, wherein the concave area and a bonding line of the wrapped end part are located on a same side of the end part.

17. The device according to claim 14, wherein the area away from the top, of the wrapped end part is a contraction area and a diameter of the contraction area is smaller than that of the top area.

18. The device according to claim 2, wherein the end part of the rod-shaped element is provided with a top end, the top end is provided with a porous film sleeve which extends outwards from the end top end, and wherein the porous film sleeve is formed by the bonding between the first layer of porous water-absorbing film and the second layer of porous water-absorbing film.

* * * * *